(12) United States Patent
LeTourneau

(10) Patent No.: US 10,140,349 B2
(45) Date of Patent: *Nov. 27, 2018

(54) METHOD AND/OR SYSTEM FOR TRANSFORMING BETWEEN TREES AND STRINGS

(71) Applicant: Robert T. and Virginia T. Jenkins as Trustees of the Jenkins Family Trust Dated Feb. 8, 2002, Sacramento, CA (US)

(72) Inventor: Jack J. LeTourneau, Ventura, CA (US)

(73) Assignees: Robert T. Jenkins, Sacramento, CA (US), as Trustees of the Jenkins Family Trust Dated Feb. 8, 2002; Virginia T. Jenkins, Sacramento, CA (US), as Trustees of the Jenkins Family Trust Dated Feb. 8, 2002

( * ) Notice: Subject to any disclaimer, the term of this patent is extended or adjusted under 35 U.S.C. 154(b) by 0 days.

This patent is subject to a terminal disclaimer.

(21) Appl. No.: 15/411,823

(22) Filed: Jan. 20, 2017

(65) Prior Publication Data

US 2017/0132301 A1    May 11, 2017

Related U.S. Application Data

(63) Continuation of application No. 14/614,292, filed on Feb. 4, 2015, now Pat. No. 9,563,653, which is a continuation of application No. 13/860,482, filed on Apr. 10, 2013, now Pat. No. 8,990,769, which is a continuation of application No. 12/702,243, filed on Feb. 8, 2010, now Pat. No. 8,443,339, which is a continuation of application No. 11/361,500, filed on Feb. 23, 2006, now Pat. No. 7,681,177.

(Continued)

(51) Int. Cl.
*G06F 9/44* (2018.01)
*G06F 17/30* (2006.01)

(52) U.S. Cl.
CPC .. *G06F 17/30569* (2013.01); *G06F 17/30289* (2013.01); *G06F 17/30327* (2013.01); *G06F 17/30589* (2013.01); *G06F 17/30961* (2013.01)

(58) Field of Classification Search
CPC ................. G06F 17/30569; G05F 17/30569
USPC ................................................ 717/110–118
See application file for complete search history.

(56) References Cited

U.S. PATENT DOCUMENTS

| 3,201,701 A | 8/1965 | Maitra |
| 3,704,345 A | 11/1972 | Coker |
| 4,001,951 A | 1/1977 | Fasse |

(Continued)

OTHER PUBLICATIONS

Hirschberg, "Algorithm for Computing Maximal Common Subsequences", Communication of the ACM, vol. 18, No. 6, pp. 341-343, 1975.*

(Continued)

*Primary Examiner* — Anil Khatri
(74) *Attorney, Agent, or Firm* — Berkeley Law & Technology Group, LLP

(57) ABSTRACT

Embodiments of articles, apparatuses, devices and/or systems for accessing, from memory, signal values for a first expression; transforming the signal values for the first expression in a first view to signal values for the first expression in a second view, and storing, in the memory, the signal values corresponding to the first expression in the second view are disclosed.

39 Claims, 14 Drawing Sheets

Related U.S. Application Data

(60) Provisional application No. 60/657,264, filed on Feb. 28, 2005.

(56) References Cited

U.S. PATENT DOCUMENTS

| | | | |
|---|---|---|---|
| 4,134,218 A | 1/1979 | Adams et al. | |
| 4,156,910 A | 5/1979 | Barton et al. | |
| 4,286,330 A * | 8/1981 | Isaacson | G06F 7/762 |
| | | | 382/181 |
| 4,439,162 A | 3/1984 | Blaine | |
| 4,677,550 A | 6/1987 | Ferguson | |
| 4,737,109 A | 4/1988 | Abramson | |
| 4,745,561 A | 5/1988 | Hirosawa et al. | |
| 4,751,684 A | 6/1988 | Holt | |
| 4,831,525 A | 5/1989 | Saito et al. | |
| 4,867,686 A | 9/1989 | Goldstein | |
| 4,931,928 A | 6/1990 | Greenfeld | |
| 4,949,388 A | 8/1990 | Bhaskaran | |
| 4,989,132 A | 1/1991 | Mellender et al. | |
| 4,991,087 A | 2/1991 | Burkowski et al. | |
| 5,021,943 A | 6/1991 | Grimes | |
| 5,021,992 A | 6/1991 | Kondo | |
| 5,050,071 A | 9/1991 | Harris et al. | |
| 5,191,522 A | 3/1993 | Bosco et al. | |
| 5,235,701 A | 8/1993 | Ohler et al. | |
| 5,265,245 A | 11/1993 | Nordstrom et al. | |
| 5,295,261 A | 3/1994 | Simonetti | |
| 5,325,531 A * | 6/1994 | McKeeman | G06F 8/20 |
| | | | 717/112 |
| 5,335,320 A | 8/1994 | Iwata | |
| 5,335,345 A | 8/1994 | Frieder et al. | |
| 5,355,496 A * | 10/1994 | Fant | G06F 8/31 |
| | | | 717/117 |
| 5,463,777 A | 10/1995 | Bialkowski et al. | |
| 5,493,504 A | 2/1996 | Minato | |
| 5,493,678 A | 2/1996 | Arcuri | |
| 5,497,500 A | 3/1996 | Rogers et al. | |
| 5,509,088 A | 4/1996 | Robson | |
| 5,519,627 A | 5/1996 | Mahmood et al. | |
| 5,522,068 A | 5/1996 | Berkowitz | |
| 5,577,253 A | 11/1996 | Blickstein | |
| 5,598,350 A | 1/1997 | Kawanishi et al. | |
| 5,606,669 A | 2/1997 | Bertin et al. | |
| 5,636,155 A | 6/1997 | Kabuo | |
| 5,687,362 A | 11/1997 | Bhargava et al. | |
| 5,706,406 A | 1/1998 | Pollock | |
| 5,724,512 A | 3/1998 | Winterbottom | |
| 5,724,576 A | 3/1998 | Letourneau | |
| 5,748,975 A * | 5/1998 | Van De Vanter | G06F 8/33 |
| | | | 715/236 |
| 5,758,152 A | 5/1998 | LeTourneau | |
| 5,778,354 A | 7/1998 | Leslie | |
| 5,778,371 A | 7/1998 | Fujihara | |
| 5,781,906 A | 7/1998 | Aggarwal et al. | |
| 5,787,415 A | 7/1998 | Jacobson et al. | |
| 5,787,432 A | 7/1998 | Letourneau | |
| 5,796,356 A | 8/1998 | Okada et al. | |
| 5,802,370 A | 9/1998 | Sitbon et al. | |
| 5,822,593 A | 10/1998 | Lamping et al. | |
| 5,826,262 A | 10/1998 | Bui | |
| 5,848,159 A | 12/1998 | Collins et al. | |
| 5,905,138 A | 5/1999 | Van Broekhoven | |
| 5,930,805 A | 7/1999 | Marquis | |
| 5,937,181 A | 8/1999 | Godefroid | |
| 5,970,490 A | 10/1999 | Morgenstern | |
| 5,978,790 A | 11/1999 | Buneman et al. | |
| 5,987,449 A | 11/1999 | Suciu | |
| 5,999,926 A | 12/1999 | Suciu | |
| 6,002,879 A | 12/1999 | Radigan et al. | |
| 6,003,033 A | 12/1999 | Amano et al. | |
| 6,022,879 A | 2/2000 | Crow et al. | |
| 6,028,987 A | 2/2000 | Hirairi | |
| 6,055,537 A | 4/2000 | LeTourneau | |
| 6,076,087 A | 6/2000 | Suciu | |
| 6,088,691 A | 7/2000 | Bhargava et al. | |
| 6,141,655 A | 10/2000 | Johnson et al. | |
| 6,199,103 B1 | 3/2001 | Sakuguchi et al. | |
| 6,236,410 B1 | 5/2001 | Politis et al. | |
| 6,243,859 B1 | 6/2001 | Chen-Kuang | |
| 6,289,354 B1 | 9/2001 | Aggarwal et al. | |
| 6,292,938 B1 | 9/2001 | Sarkar et al. | |
| 6,314,559 B1 | 11/2001 | Sollich | |
| 6,336,812 B1 | 1/2002 | Cooper et al. | |
| 6,341,372 B1 | 1/2002 | Datig | |
| 6,442,584 B1 | 8/2002 | Kolli et al. | |
| 6,446,256 B1 | 9/2002 | Hyman et al. | |
| 6,466,240 B1 | 10/2002 | Maslov | |
| 6,505,205 B1 | 1/2003 | Kothuri et al. | |
| 6,542,899 B1 | 4/2003 | Saulpaugh et al. | |
| 6,550,024 B1 | 4/2003 | Pagurek et al. | |
| 6,556,983 B1 | 4/2003 | Altschuler et al. | |
| 6,598,052 B1 | 7/2003 | Saulpaugh et al. | |
| 6,606,632 B1 | 8/2003 | Saulpaugh et al. | |
| 6,606,741 B2 * | 8/2003 | Kojima | G06F 8/34 |
| | | | 715/763 |
| 6,609,130 B1 | 8/2003 | Saulpaugh et al. | |
| 6,610,106 B1 * | 8/2003 | Jenks | G06F 17/215 |
| | | | 708/142 |
| 6,611,844 B1 | 8/2003 | Saulpaugh et al. | |
| 6,640,218 B1 | 10/2003 | Golding | |
| 6,658,649 B1 | 12/2003 | Bates et al. | |
| 6,691,301 B2 * | 2/2004 | Bowen | G06F 17/5045 |
| | | | 712/15 |
| 6,714,939 B2 | 3/2004 | Saldanha et al. | |
| 6,728,953 B1 * | 4/2004 | Walster | G06F 8/443 |
| | | | 717/140 |
| 6,745,384 B1 | 6/2004 | Biggerstaff | |
| 6,748,378 B1 | 6/2004 | Lavender et al. | |
| 6,763,515 B1 | 7/2004 | Vazquez et al. | |
| 6,785,673 B1 | 8/2004 | Fernandez et al. | |
| 6,817,865 B2 | 11/2004 | Charbonneau | |
| 6,829,695 B1 | 12/2004 | Ross | |
| 6,847,979 B2 | 1/2005 | Allemang et al. | |
| 6,854,976 B1 | 2/2005 | Suhr | |
| 6,874,005 B2 | 3/2005 | Fortenberry et al. | |
| 6,880,148 B1 * | 4/2005 | Raph | G06F 8/31 |
| | | | 717/114 |
| 6,965,990 B2 | 11/2005 | Barsness et al. | |
| 6,968,330 B2 | 11/2005 | Edwards et al. | |
| 6,978,271 B1 | 12/2005 | Hoffman | |
| 7,043,555 B1 | 5/2006 | McClain et al. | |
| 7,051,033 B2 | 5/2006 | Agarwal et al. | |
| 7,072,904 B2 | 7/2006 | Najork et al. | |
| 7,103,838 B1 | 9/2006 | Krishnamurthy et al. | |
| 7,107,265 B1 | 9/2006 | Calvignac et al. | |
| 7,117,196 B2 | 10/2006 | Gaur et al. | |
| 7,117,479 B2 | 10/2006 | Van De Vanter | |
| 7,127,704 B2 * | 10/2006 | Van De Vanter | G06F 8/33 |
| | | | 717/112 |
| 7,134,075 B2 | 11/2006 | Hind et al. | |
| 7,140,006 B2 | 11/2006 | Harrison et al. | |
| 7,162,485 B2 | 1/2007 | Gottlob et al. | |
| 7,191,182 B2 | 3/2007 | Anonsen et al. | |
| 7,203,680 B2 | 4/2007 | Parida | |
| 7,203,774 B1 | 4/2007 | Zhou et al. | |
| 7,287,026 B2 | 10/2007 | Oommen | |
| 7,313,563 B2 | 12/2007 | Bordawekar et al. | |
| 7,318,215 B1 | 1/2008 | Krishnan et al. | |
| 7,337,163 B1 | 2/2008 | Srinivasan | |
| 7,356,802 B2 | 4/2008 | de Sutter et al. | |
| 7,360,202 B1 | 4/2008 | Seshadri et al. | |
| 7,409,673 B2 * | 8/2008 | Kuo | G06F 8/33 |
| | | | 708/420 |
| 7,419,376 B2 | 9/2008 | Sarvazyan et al. | |
| 7,437,666 B2 | 10/2008 | Ramarao | |
| 7,475,070 B2 | 1/2009 | Fan et al. | |
| 7,496,892 B2 | 2/2009 | Nuss | |
| 7,512,932 B2 | 3/2009 | Davidov et al. | |
| 7,536,675 B2 | 5/2009 | Gallagher | |
| 7,536,676 B2 | 5/2009 | Baker | |
| 7,544,062 B1 | 6/2009 | Hauschild et al. | |
| 7,561,927 B2 | 7/2009 | Oyama et al. | |
| 7,571,156 B1 | 8/2009 | Gupta et al. | |

(56) References Cited

U.S. PATENT DOCUMENTS

| | | | |
|---|---|---|---|
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 * | 3/2010 | LeTourneau ...... G06F 17/30961 717/112 |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,801,923 B2 | 9/2010 | LeTourneau |
| 7,861,304 B1 * | 12/2010 | Nachenberg .......... G06F 21/564 713/188 |
| 7,882,147 B2 | 2/2011 | LeTourneau |
| 7,890,928 B2 | 2/2011 | Patrudu |
| 7,899,821 B1 | 3/2011 | Schiffmann |
| 8,020,145 B2 * | 9/2011 | Fant ..................... G06F 8/314 717/114 |
| 8,032,860 B2 | 10/2011 | Piehler et al. |
| 8,037,102 B2 | 10/2011 | LeTourneau |
| 8,060,868 B2 | 11/2011 | Meijer et al. |
| 8,112,740 B2 | 2/2012 | Meijer et al. |
| 8,151,276 B2 | 4/2012 | Grechanik |
| 8,181,155 B2 | 5/2012 | Pinto et al. |
| 8,230,526 B2 | 7/2012 | Holland et al. |
| 8,250,526 B2 | 8/2012 | Anderson et al. |
| 8,316,059 B1 | 11/2012 | Schiffmann |
| 8,356,040 B2 | 1/2013 | LeTourneau |
| 8,365,137 B2 | 1/2013 | Fant |
| 8,438,534 B2 | 5/2013 | Thomson |
| 8,443,339 B2 | 5/2013 | LeTourneau |
| 8,484,236 B1 * | 7/2013 | Andrews .......... G06F 17/30985 707/713 |
| 8,626,777 B2 | 1/2014 | LeTourneau |
| 8,650,201 B2 | 2/2014 | LeTourneau |
| 8,683,431 B2 | 3/2014 | Thomson et al. |
| 8,762,942 B2 | 6/2014 | Langworthy et al. |
| 8,869,106 B2 * | 10/2014 | Jazdzewski ............... G06F 8/43 717/114 |
| 8,990,769 B2 * | 3/2015 | LeTourneau ...... G06F 17/30961 717/112 |
| 9,002,862 B2 | 4/2015 | Schiffmann |
| 9,020,961 B2 | 4/2015 | LeTourneau |
| 9,043,347 B2 | 5/2015 | LeTourneau |
| 9,077,515 B2 | 7/2015 | LeTourneau |
| 9,330,128 B2 | 5/2016 | Schiffmann |
| 9,411,841 B2 | 8/2016 | Schiffmann |
| 9,425,951 B2 | 8/2016 | LeTourneau |
| 9,430,512 B2 | 8/2016 | LeTourneau |
| 9,563,653 B2 | 2/2017 | LeTourneau |
| 9,646,034 B2 | 5/2017 | Schiffmann |
| 9,646,107 B2 | 5/2017 | LeTourneau |
| 9,842,130 B2 | 12/2017 | Schiffmann |
| 10,055,438 B2 | 8/2018 | Schiffmann |
| 10,068,003 B2 | 9/2018 | Schiffmann |
| 2001/0003211 A1 | 6/2001 | Bera |
| 2001/0037496 A1 | 11/2001 | Simonyi |
| 2002/0062259 A1 | 2/2002 | Katz et al. |
| 2002/0040292 A1 | 4/2002 | Marcu |
| 2002/0059281 A1 | 5/2002 | Watanabe et al. |
| 2002/0091676 A1 | 7/2002 | Agrawal |
| 2002/0107860 A1 | 8/2002 | Gobeille et al. |
| 2002/0129129 A1 | 9/2002 | Bloch et al. |
| 2002/0130796 A1 | 9/2002 | Tsuchido et al. |
| 2002/0133347 A1 | 9/2002 | Schoneburg |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2002/0194163 A1 | 12/2002 | Hopeman |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236794 A1 | 12/2003 | Hostetter et al. |
| 2004/0010752 A1 | 1/2004 | Chan et al. |
| 2004/0019599 A1 | 1/2004 | Trappen |
| 2004/0024724 A1 | 2/2004 | Rubin |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060060 A1 | 3/2004 | Lindblad |
| 2004/0060007 A1 | 3/2004 | Gottlob et al. |
| 2004/0068498 A1 | 4/2004 | Patchet et al. |
| 2004/0075677 A1 | 4/2004 | Loyall |
| 2004/0103105 A1 | 5/2004 | Lindblad et al. |
| 2004/0122844 A1 | 6/2004 | Malloy |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0260684 A1 | 12/2004 | Agrawal et al. |
| 2004/0268236 A1 | 12/2004 | Chidlovskii et al. |
| 2005/0021548 A1 | 1/2005 | Bohannon et al. |
| 2005/0023524 A1 | 2/2005 | Beatty |
| 2005/0027495 A1 | 2/2005 | Matichuk |
| 2005/0027743 A1 | 2/2005 | O'Neil et al. |
| 2005/0028091 A1 | 2/2005 | Bordawekar |
| 2005/0050016 A1 | 3/2005 | Stanoi et al. |
| 2005/0050066 A1 | 3/2005 | Hughes |
| 2005/0058976 A1 | 3/2005 | Vernon |
| 2005/0060332 A1 | 3/2005 | Bernstein et al. |
| 2005/0065964 A1 | 3/2005 | Ziemann et al. |
| 2005/0125432 A1 | 6/2005 | Lin et al. |
| 2005/0138073 A1 | 6/2005 | Zhou et al. |
| 2005/0154265 A1 | 7/2005 | Miro et al. |
| 2005/0154979 A1 | 7/2005 | Chidlovskii et al. |
| 2005/0156761 A1 | 7/2005 | Oh |
| 2005/0165732 A1 | 7/2005 | Burges |
| 2005/0187900 A1 | 8/2005 | LeTourneau |
| 2005/0214727 A1 | 9/2005 | Stoianovici et al. |
| 2005/0216445 A1 | 9/2005 | Rao |
| 2005/0267908 A1 | 12/2005 | LeTourneau |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito et al. |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2008/0270435 A1 | 10/2008 | Furusho |
| 2008/0313196 A1 | 10/2008 | Furusho |
| 2010/0094885 A1 | 4/2010 | LeTourneau |
| 2010/0094908 A1 | 4/2010 | LeTourneau |
| 2010/0114969 A1 | 4/2010 | LeTourneau |
| 2010/0191775 A1 | 7/2010 | Schiffmann et al. |
| 2010/0205581 A1 | 8/2010 | LeTourneau |
| 2012/0144388 A1 | 6/2012 | Schiffmann |

OTHER PUBLICATIONS

Caviness et al, " Simplification of Radical Expressions", ACM, pp. 329-338, 1976.*

(56) References Cited

OTHER PUBLICATIONS

Siegel, "All Searches Are Divided into Three Parts String Searches Using Ternary Trees", ACM, pp. 57-68, 1988.*
Li et al, "Reggae: Automated Test Generation for Programs using Complex Regular Expressions", IEEE, pp. 515-519, 2009.*
Benedikt et al, " Definable Relations and First-Order Query Languages over Strings", ACM, vol. 50, No. 5, pp. 694-751, 2003.*
Sinha et al, "Efficient Trie Based Sorting of Large Set of Strings", ACM, pp. 1-8, 2003.*
Broberg et al, "Regular Expression Patterns", ACM, pp. 67-78, 2004.*
"Core Technology Benchmarks a White Paper", Jul. 2002, downloaded from the internet Mar. 2, 2004.
"Origin Data, Inc. White Paper", © 1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime Number Theorem", Engineering and Science, No. 4, 1996.
Benedikt et al., "Definable Relations and First-Order Query Languages over Strings" Journal of the ACM, vol. 50, No. 5, pp. 694-751, 2003.
Borodin et al., "A Tradeoff Between Search and Update Time for the Implicit Dictionary Problem", Theoretical Computer Science vol. 1 No. 4 (1990), 425-447.
Cano et al., "Lazy Evaluation in Penniless Propagation over Join Trees", Networks, vol. 39(4), 2002 Wiley Periodicals, Inc., 175-185, 2002.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
Cooper et al., "Oh! Pascal!", 1982, W.W. Norton & Company, Inc., Chapter 12, Arrays for Random Access, pp. 295-327.
Coenen, Frans; Leng, Paul and Ahmed, Shakil; "T-Trees, Vertical Partitioning and Distributed Association Rule Mining", IEEE, 2003.
Dubiner, M., Galil, Z., and Magen, E. "Faster Tree Pattern Matching.", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Ferragina et al., "The String B-Tree: A New Data Structure for String Search in External Memory and Its Applications", Journal of the ACM, vol. 46, No. 2, pp. 236-280, 1999.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Katajainen et al., "Tree Compression and Optimization with Applications", International Journal of Foundations of Computer Science, vol. 1 No. 4 (1990), 425-447.
Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267, 1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Prasad et al., "Efficient Bit-Parallel Multi-Patterns String Matching Algorithms for Limited Expression", ACM, pp. 1-6, 2010.
Ramesh, R. and Ramakrishnan, I.V., "Nonlinear Pattern Matching in Trees." Journal of the Association for Computer Machinery, vol. 39, No. 2. Apr. 1992, pp. 295-316.
Reiss, "Semantics-Based Code Search", IEEE ICSE, pp. 243-253, 2009.
Schmidt et al., "Comparision of Tree and Graph Encodings as Function of Problem Complexity", ACM, pp. 1674-1679, 2007.
Sechrest et al., "Blending Hierarchical and Attribute-Based File Naming", Distributed Computing System, 1992, Proceedings of the 12th International Conference on Jun. 9-12, 1992, pp. 572-580.
Shanmugasundaram et al., "Querying SML Views of Relational Data", Proceedings of the 27th VLDB Conference, Roma, Italy, 2001, 9 pages.
Sinha et al, "Efficient Trie Based Sorting of Large Sets of Strings," ACM, pp. 1-8, 2003.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, © 1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Spinells "Declarative Peephole Optimization Using String Pattern Matching", ACM, pp. 47-51, 1999.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.

(56) References Cited

OTHER PUBLICATIONS

Talukdar, "Learning to Create Data-Integrating Queries", ACM PVLDB, pp. 785-796, 2008.
Thiemann, "Grammar-Based Analysis of String Expressions", ACM, pp. 59-70, 2005.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wagner et al., "The String-to-String Correction Problem", Journal of the Association for Computing Machinery, vol. 21, No. 1, pp. 168-173, 1974.
Wu, "A Prime Number Labeling Scheme for Dynamic Ordered XML Trees", IEEE, 2004, 13 pages.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
Zaks, S., "Lexicographic Generation of Ordered Trees", Dept. of Computer Science, University of Illinois, The Journal of Theoretical Computer Science, vol. 10(1), pp. 63-82, Revised 1978.
U.S. Appl. No. 11/005,859, filed Dec. 6, 2004, 120 pages.
U.S. Appl. No. 11/005,859: Notice to File Missing parts dated Jan. 10, 2005, 2 pages.
U.S. Appl. No. 11/005,859: Response to Notice to File Missing parts dated Apr. 1, 2005, 9 pages.
U.S. Appl. No. 11/005,859: Preliminary Amendment dated Apr. 28, 2005, 193 pages.
U.S. Appl. No. 11/005,859: Office Action—Restriction Requirement dated Dec. 12, 2007, 7 pages.
U.S. Appl. No. 11/005,859: Response to Office Action—Restriction Requirement filed Jan. 14, 2008, 82 pages.
U.S. Appl. No. 11/005,859: Non-final Office Action dated Mar. 21, 2008, 10 pages.
U.S. Appl. No. 11/005,859: Amendment dated Jul. 21, 2008, 86 pages.
U.S. Appl. No. 11/005,859: Final Office Action dated Oct. 30, 2008, 14 pages.
U.S. Appl. No. 11/005,859: Amendment dated Dec. 30, 2008, 83 pages.
U.S. Appl. No. 11/005,859: Advisory Action dated Jan. 13, 2009, 4 pages.
U.S. Appl. No. 11/005,859: RCE with amendment dated Apr. 30, 2009, 86 pages.
U.S. Appl. No. 11/005,859: Final Office Action dated Jul. 8, 2009, 9 pages.
U.S. Appl. No. 11/005,859: Examiner Interview Summary dated Oct. 27, 2009, 3 pages.
U.S. Appl. No. 11/005,859: Amendment dated Dec. 8, 2009, 83 pages.
U.S. Appl. No. 11/005,859: Advisory Action dated Dec. 22, 2009, 3 pages.
U.S. Appl. No. 11/005,859: RCE with Amendment dated Jan. 7, 2010, 85 pages.
U.S. Appl. No. 11/005,859: Non-Final Office Action dated Jan. 21, 2010, 8 pages.
U.S. Appl. No. 11/005,859: Response to Non-Final Office Action dated Feb. 25, 2010, 83 pages.
U.S. Appl. No. 11/005,859: Final Office Action dated Jun. 8, 2010, 9 pages.
U.S. Appl. No. 11/005,859: Office Action Response dated Sep. 1, 2010, 89 pages.
U.S. Appl. No. 11/005,859: Advisory Action dated Sep. 14, 2010, 3 pages.
U.S. Appl. No. 11/005,859: Notice of Appeal dated Sep. 29, 2010, 1 page.
U.S. Appl. No. 11/005,859: Office Action dated Oct. 15, 2010, 5 pages.
U.S. Appl. No. 11/005,859: Office Action Response dated Jan. 18, 2011, 95 pages.
U.S. Appl. No. 11/005,859: Final Office Action dated Mar. 30, 2011, 7 pages.
U.S. Appl. No. 11/005,859: Notice of Allowance and Fees Due, dated Jun. 9, 2011, 11 pages.
U.S. Appl. No. 11/005,859: Amendment after Notice of Allowance and Issue Fee Payment, dated Sep. 9, 2011, 2 pages.
U.S. Appl. No. 11/005,859: Issue Notification, dated Sep. 21, 2011, 1 page.
U.S. Appl. No. 13/229,624, filed Sep. 9, 2011, 139 pages.
U.S. Appl. No. 13/229,624: Filing receipt, dated Sep. 21, 2011, 4 pages.
U.S. Appl. No. 13/229,624: Non-Final Office Action, dated Nov. 23, 2011, 8 pages.
U.S. Appl. No. 13/229,624: Notice of Publication, dated Dec. 30, 2011, 1 page.
U.S. Appl. No. 13/229,624: Amendment, dated Feb. 23, 2012, 22 pages.
U.S. Appl. No. 13/229,624: Final Office Action, dated Mar. 20, 2012, 10 pages.
U.S. Appl. No. 13/229,624: Amendment after final, dated Jun. 13, 2012, 25 pages.
U.S. Appl. No. 13/229,624: Advisory Action, dated Jun. 20, 2012, 4 pages.
U.S. Appl. No. 13/229,624: RCE, dated Jul. 20, 2012, 26 pages.
U.S. Appl. No. 13/229,624: Non-Final Rejection, dated Oct. 2, 2013, 9 pages.
U.S. Appl. No. 13/229,624: Response to non-final office action, dated Dec. 27, 2013, 11 pages.
U.S. Appl. No. 13/229,624: Non-Final Office Action, dated Apr. 4, 2014, 5 Pages.
U.S. Appl. No. 13/229,624: Non-Final Office Action Response, dated Aug. 1, 2014, 9 Pages.
U.S. Appl. No. 13/229,624: Final Rejection, dated Oct. 30, 2014, 6 pages.
U.S. Appl. No. 13/229,624: Response and Amendments after Final, dated Jan. 30, 2015, 11 pages.
U.S. Appl. No. 13/229,624: Advisory Action, dated Mar. 11, 2015, 3 pages.
U.S. Appl. No. 13/229,624: Applicant Initiated Interview Summary, dated Mar. 19, 2015, 3 pages.
U.S. Appl. No. 13/229,624: Response After Final Action and Interview Summary, dated Mar. 27, 2015, 20 pages.
U.S. Appl. No. 13/229,624: RCE and Amendments, dated Apr. 27, 2015, 17 pages.
U.S. Appl. No. 13/229,624: Notice of Allowance and Fees, dated Jul. 6, 2015, 21 pages.
U.S. Appl. No. 13/229,624: Issue Fee Payment, dated Sep. 28, 2015, 1 page.
U.S. Appl. No. 13/229,624: Issue Notification, dated Oct. 14, 2015, 1 page.
U.S. Appl. No. 14/870,744, filed Sep. 30, 2015, 127 pages.
U.S. Appl. No. 14/870,744: Preliminary Amendments, dated Oct. 6, 2015, 10 pages.
U.S. Appl. No. 14/870,744: Notice to File Missing Parts, dated Oct. 16, 2015, 2 pages.
U.S. Appl. No. 14/870,744: Filing Receipt, dated Oct. 16, 2015, 3 pages.
U.S. Appl. No. 14/870,744: Applicant Response to Pre-Exam Formalities Notice, dated Feb. 19, 2016, 2 pages.
U.S. Appl. No. 14/870,744: Filing Receipt, dated Mar. 2, 2016, 3 pages.
U.S. Appl. No. 14/870,744: Notice of Publication, dated Jun. 9, 2016, 1 page.
U.S. Appl. No. 14/870,744: Non-Final Rejection, dated Aug. 24, 2017, 11 pages.
U.S. Appl. No. 11/007,139, filed Dec. 7, 2004, 90 pages.
U.S. Appl. No. 11/007,139: Notice to File Missing Parts dated Jan. 19, 2005, 2 pages.
U.S. Appl. No. 11/007,139: Response to Notice to File Missing Parts dated Apr. 1, 2005, 9 pages.
U.S. Appl. No. 11/007,139: Preliminary Amendment dated Apr. 28, 2005, 146 pages.

(56) References Cited

OTHER PUBLICATIONS

U.S. Appl. No. 11/007,139: Non-final Office Action dated May 14, 2007, 58 pages.
U.S. Appl. No. 11/007,139: Amendment dated Oct. 15, 2007, 32 pages.
U.S. Appl. No. 11/007,139: Supplemental Response dated Oct. 17, 2007, 7 pages.
U.S. Appl. No. 11/007,139: Non-final Office Action dated Jan. 2, 2008 with Examiner's search results, 21 pages.
U.S. Appl. No. 11/007,139: Amendment dated Apr. 2, 2008, 30 pages.
U.S. Appl. No. 11/007,139: Final Office Action dated Aug. 15, 2008, 30 pages.
U.S. Appl. No. 11/007,139: Amendment dated Oct. 15, 2008, 26 pages.
U.S. Appl. No. 11/007,139: Advisory Action dated Oct. 22, 2008, 26 pages.
U.S. Appl. No. 11/007,139: RCE with Amendment dated Nov. 14, 2008, 32 pages.
U.S. Appl. No. 11/007,139: Non-final Office Action dated Dec. 8, 2008, 24 pages.
U.S. Appl. No. 11/007,139: Amendment dated May 8, 2009, 31 pages.
U.S. Appl. No. 11/007,139: Final Office Action dated Aug. 4, 2009, 26 pages.
U.S. Appl. No. 11/007,139: Amendment dated Dec. 4, 2009, 28 pages.
U.S. Appl. No. 11/007,139: Advisory Action dated Dec. 14, 2009, 4 pages.
U.S. Appl. No. 11/007,139: RCE with amendment dated Jan. 4, 2010, 27 pages.
U.S. Appl. No. 11/007,139: Non-Final Office Action dated Jan. 27, 2010, 31 pages.
U.S. Appl. No. 11/007,139: Response to Non-Final Office Action dated Apr. 27, 2010, 30 pages.
U.S. Appl. No. 11/007,139: Office Action dated Jul. 20, 2010, 20 pages.
U.S. Appl. No. 11/007,139: Office Action response dated Oct. 20, 2010, 33 pages.
U.S. Appl. No. 11/007,139: Advisory Action dated Oct. 25, 2010, 2 pages.
U.S. Appl. No. 11/007,139: Office Action response dated Nov. 18, 2010, 24 pages.
U.S. Appl. No. 11/007,139: Advisory Action dated Dec. 1, 2010, 4 pages.
U.S. Appl. No. 11/007,139: Office Action response and Notice of Appeal dated Dec. 20, 2010, 29 pages.
U.S. Appl. No. 11/007,139: Office Action dated Jan. 3, 2011, 24 pages.
U.S. Appl. No. 11/007,139: Office Action response, dated May 3, 2011, 27 pages.
U.S. Appl. No. 11/007,139: Final Office Action, dated Jul. 18, 2011, 23 pages.
U.S. Appl. No. 11/007,139: Amendment after final dated Oct. 18, 2011, 30 pages.
U.S. Appl. No. 11/007,139: Advisory Action and rule 312 amendment, dated Nov. 4, 2011, 4 pages.
U.S. Appl. No. 11/007,139: Notice of Appeal dated Nov. 16, 2011, 1 page.
U.S. Appl. No. 11/007,139: Appeal Brief dated May 1, 2012, 93 pages.
U.S. Appl. No. 11/007,139: Notice of defective appeal brief, dated May 7, 2012, 3 pages.
U.S. Appl. No. 11/007,139: Appeal Brief dated May 15, 2012, 9 pages.
U.S. Appl. No. 11/007,139: Examiner's answer to appeal brief, dated Aug. 20, 2012, 35 pages.
U.S. Appl. No. 11/007,139: Reply Brief, dated Oct. 22, 2012, 29 pages.
U.S. Appl. No. 11/007,139: Appeal Docketing Notice, dated Nov. 6, 2012, 2 pages.
U.S. Appl. No. 11/007,139: Patent Board Decision, dated Jul. 24, 2015, 8 pages.
U.S. Appl. No. 11/007,139: RCE, dated Sep. 18, 2015, 19 pages.
U.S. Appl. No. 11/007,139: Non-Final Rejection, dated Dec. 31, 2015, 10 pages.
U.S. Appl. No. 11/007,139: Amendment/Req. Reconsideration-After Non-Final Rejection, dated Mar. 28, 2016, 19 pages.
U.S. Appl. No. 11/007,139: Final Rejection, dated Jun. 20, 2016, 12 pages.
U.S. Appl. No. 11/007,139: Response After Final Action, dated Jul. 29, 2016, 17 pages.
U.S. Appl. No. 11/007,139: Notice of Allowance and Fees, dated Aug. 23, 2016, 10 pages.
U.S. Appl. No. 11/007,139: Filing Receipt, dated Sep. 2, 2016, 3 pages.
U.S. Appl. No. 11/007,139: RCE, dated Nov. 10, 2016, 3 pages.
U.S. Appl. No. 11/007,139: Notice of Allowance and Fees, dated Dec. 29, 2016, 8 pages.
U.S. Appl. No. 11/007,139: Issue Notification, dated Apr. 19, 2017, 1 page.
U.S. Appl. No. 15/043,267, filed Feb. 12, 2016, 92 pages.
U.S. Appl. No. 15/043,267: Preliminary Amendment, dated Feb. 12, 2016, 7 pages.
U.S. Appl. No. 15/043,267: Filing Receipt, dated Mar. 7, 2016, 3 pages.
U.S. Appl. No. 15/043,267: Preliminary Amendment, dated Jun. 10, 2016, 9 pages.
U.S. Appl. No. 15/043,267: Filing Receipt, dated Oct. 25, 2016, 3 pages.
U.S. Appl. No. 15/043,267: Notice of Publication, dated Feb. 2, 2017, 1 page.
U.S. Appl. No. 11/006,320, filed Dec. 6, 2004, 75 pages.
U.S. Appl. No. 11/006,320: Response to Missing Parts and Preliminary Amendment dated May 9, 2005, 135 pages.
U.S. Appl. No. 11/006,320: Office Action—Restriction Requirement dated Mar. 26, 2007, 7 pages.
U.S. Appl. No. 11/006,320: Response to Restriction Requirement dated Apr. 27, 2007, 34 pages.
U.S. Appl. No. 11/006,320: Notice of Non-Compliant Amendment dated Jul. 6, 2007, 3 pages.
U.S. Appl. No. 11/006,320: Response to Non-Compliant Amendment dated Jul. 25, 2007, 33 pages.
U.S. Appl. No. 11/006,320: Non-final Office Action dated Oct. 1, 2007, 24 pages.
U.S. Appl. No. 11/006,320: Amendment dated Jan. 29, 2008, 45 pages.
U.S. Appl. No. 11/006,320: Notice of Non-Compliant Amendment dated Apr. 8, 2008, 4 pages.
U.S. Appl. No. 11/006,320: Amendment dated May 5, 2008, 44 pages.
U.S. Appl. No. 11/006,320: Non-final Office Action dated Aug. 15, 2008, 33 pages.
U.S. Appl. No. 11/006,320: Amendment dated Nov. 14, 2008, 40 pages.
U.S. Appl. No. 11/006,320: Office Action—Shortened Statutory Period dated Jan. 27, 2009, 2 pages.
U.S. Appl. No. 11/006,320: Amendment dated Apr. 27, 2009, 44 pages.
U.S. Appl. No. 11/006,320: Final Office Action dated Jul. 29, 2009, 13 pages.
U.S. Appl. No. 11/006,320: Amendment dated Nov. 30, 2009, 10 pages.
U.S. Appl. No. 11/006,320: Non-final Office Action dated Dec. 4, 2009, 25 pages.
U.S. Appl. No. 11/006,320: Response to Non-Final Office Action dated Feb. 23, 2010, 11 pages.
U.S. Appl. No. 11/006,320: Final Office Action dated May 24, 2010, 11 pages.
U.S. Appl. No. 11/006,320: Office Action response dated Aug. 24, 2010, 15 pages.

(56) References Cited

OTHER PUBLICATIONS

U.S. Appl. No. 11/006,320: Notice of Allowance dated Sep. 17, 2010, 8 pages.
U.S. Appl. No. 11/006,320: Examiner Interview Summary and supplemental Notice of Allowance dated Dec. 17, 2010, 9 pages.
U.S. Appl. No. 11/006,320: Rule 312 Amendment and Issue Fee payment dated Dec. 17, 2010, 10 pages.
U.S. Appl. No. 11/006,320: Issue Notification dated Jan. 12, 2011, 1 page.
U.S. Appl. No. 12/972,326, filed Dec. 17, 2010, 74 pages.
U.S. Appl. No. 12/972,326: Filing receipt and Notice to File Missing Parts dated Jan. 6, 2011, 5 pages.
U.S. Appl. No. 12/972,326: Response to Notice to File Missing parts dated Jan. 26, 2011, 14 pages.
U.S. Appl. No. 12/972,326: Filing Receipt, dated Feb. 18, 2011, 3 pages.
U.S. Appl. No. 12/972,326: Preliminary amendment dated May 20, 2011, 15 pages.
U.S. Appl. No. 12/972,326: Notice of publication and non-compliant amendment dated Jun. 2, 2011, 3 pages.
U.S. Appl. No. 12/972,326: Preliminary amendment dated Jul. 5, 2011, 21 pages.
U.S. Appl. No. 12/972,326: Notice of additional fee due, dated Jul. 12, 2011, 2 pages.
U.S. Appl. No. 12/972,326: Preliminary Amendment dated Aug. 10, 2011, 7 pages.
U.S. Appl. No. 12/972,326: Non-Final Office Action, dated Feb. 23, 2012, 9 pages.
U.S. Appl. No. 12/972,326: Abandonment, dated Sep. 18, 2012, 2 pages.
U.S. Appl. No. 13/014,677, filed Jan. 26, 2011, 90 pages.
U.S. Appl. No. 13/014,677: Notice to file missing parts and filing receipt, dated Mar. 23, 2011, 5 pages.
U.S. Appl. No. 13/014,677: Notice of Abandonment dated Nov. 29, 2011, 2 pages.
U.S. Appl. No. 11/006,848, filed Dec. 7, 2004, 59 pages.
U.S. Appl. No. 11/006,848: Notice to File Missing Parts dated Mar. 18, 2005, 2 pages.
U.S. Appl. No. 11/006,848: Response to Notice to File Missing Parts dated May 3, 2005, 101 pages.
U.S. Appl. No. 11/006,848: Non-Final Office Action dated Apr. 4, 2007, 11 pages.
U.S. Appl. No. 11/006,848: Response to Non-Final Office Action dated Oct. 3, 2007, 20 pages.
U.S. Appl. No. 11/006,848: Supplemental Amendment dated Nov. 13, 2007, 4 pages.
U.S. Appl. No. 11/006,848: Non-Final Office Action dated Feb. 5, 2008, 16 pages.
U.S. Appl. No. 11/006,848: Response to Non-Final Office Action dated Aug. 4, 2008, 27 pages.
U.S. Appl. No. 11/006,848: Final Office Action dated Dec. 2, 2008, 30 pages.
U.S. Appl. No. 11/006,848: RCE dated May 4, 2009, 24 pages.
U.S. Appl. No. 11/006,848: Notice of Allowance dated Jun. 11, 2009, 8 pages.
U.S. Appl. No. 11/006,848: Issue fee dated Sep. 11, 2009, 10 pages.
U.S. Appl. No. 11/006,848: Issue Notification dated Oct. 28, 2009, 1 page.
U.S. Appl. No. 12/573,829, filed Oct. 5, 2009, 64 pages.
U.S. Appl. No. 12/573,829: Notice to File Missing Parts and Filing Receipt dated Oct. 20, 2009, 5 pages.
U.S. Appl. No. 12/573,829: Preliminary Amendment dated Dec. 21, 2009, 17 pages.
U.S. Appl. No. 12/573,829: Filing receipt dated Jan. 4, 2010, 5 pages.
U.S. Appl. No. 12/573,829: Notice of Publication dated Apr. 15, 2010, 1 page.
U.S. Appl. No. 12/573,829: Office Action dated Jun. 28, 2010, 35 pages.
U.S. Appl. No. 12/573,829: Office Action Response dated Sep. 28, 2010, 22 pages.
U.S. Appl. No. 12/573,829: Office Action dated Nov. 1, 2010, 29 pages.
U.S. Appl. No. 12/573,829: Office Action Response dated Jan. 3, 2011, 29 pages.
U.S. Appl. No. 12/573,829: Advisory Action dated Jan. 7, 2011, 3 pages.
U.S. Appl. No. 12/573,829: Notice of Appeal dated Jan. 11, 2011, 1 page.
U.S. Appl. No. 12/573,829: Appeal Brief, dated May 4, 2011, 68 pages.
U.S. Appl. No. 12/573,829: Examiner's Answer to Appeal Brief, dated Jul. 21, 2011, 31 pages.
U.S. Appl. No. 12/573,829: Reply brief dated Sep. 21, 2011, 17 pages.
U.S. Appl. No. 12/573,829: Reply brief dated Oct. 5, 2011, 2 pages.
U.S. Appl. No. 12/573,829: Appeal Docketing notice Oct. 11, 2011, 2 pages.
U.S. Appl. No. 12/573,829: Appeal Board Decision, mailed May 9, 2014, 10 pages.
U.S. Appl. No. 12/573,829: Request for continued examination, dated Jul. 9, 2014, 19 pages.
U.S. Appl. No. 12/573,829: Non-Final Rejection and Examiner's Search, dated Apr. 28, 2015, 22 pages.
U.S. Appl. No. 12/573,829: Amendment/Req. Reconsideration After Non-Final Rejection, dated Jul. 27, 2015, 21 pages.
U.S. Appl. No. 12/573,829: Final Rejection and Examiner search, dated Sep. 15, 2015, 17 pages.
U.S. Appl. No. 12/573,829: Response After Final Action, dated Nov. 16, 2015, 17 pages.
U.S. Appl. No. 12/573,829: Advisory Action, dated Dec. 2, 2015, 4 pages.
U.S. Appl. No. 12/573,829: Request for Continued Examination and Amendments, dated Dec. 14, 2015, 17 pages.
U.S. Appl. No. 12/573,829: Non-Final Rejection, dated Jun. 13, 2016, 18 pages.
U.S. Appl. No. 12/573,829: Amendment/Req. Reconsideration—After Non-Final Reject, dated Sep. 13, 2016, 24 pages.
U.S. Appl. No. 12/573,829: Filing Receipt, dated Sep. 15, 2016, 3 pages.
U.S. Appl. No. 12/573,829: Non-Final Rejection, dated Dec. 16, 2016, 10 pages.
U.S. Appl. No. 12/573,829: Amendment/Req. Reconsideration—After Non-Final Reject, dated Mar. 16, 2017, 18 pages.
U.S. Appl. No. 12/573,829: Final Rejection, dated May 2, 2017, 20 pages.
U.S. Appl. No. 12/573,829: After Final Consideration Program Request, dated Jul. 5, 2017, 13 pages.
U.S. Appl. No. 12/573,829: Advisory Action/After Final Consideration Program Decision, dated Aug. 29, 2017, 5 pages.
U.S. Appl. No. 12/573,829: RCE and Amendments, dated Sep. 5, 2017, 24 pages.
U.S. Appl. No. 11/006,841, filed Dec. 7, 2004, 63 pages.
U.S. Appl. No. 11/006,841: Notice to file missing parts dated Jan. 10, 2005, 2 pages.
U.S. Appl. No. 11/006,841: Response to Notice to file missing parts and preliminary amendment dated Apr. 14, 2005, 105 pages.
U.S. Appl. No. 11/006,841: Non-Final OA dated Apr. 6, 2007, 16 pages.
U.S. Appl. No. 11/006,841: Response to Non-Final OA dated Sep. 6, 2007, 63 pages.
U.S. Appl. No. 11/006,841: Restriction Requirement dated Nov. 27, 2007, 5 pages.
U.S. Appl. No. 11/006,841: Restriction Requirement response dated Dec. 27, 2007, 36 pages.
U.S. Appl. No. 11/006,841: Restriction Requirement dated Mar. 17, 2008, 9 pages.
U.S. Appl. No. 11/006,841: Response to Restriction Requirement dated Jul. 17, 2008, 33 pages.
U.S. Appl. No. 11/006,841: Final Office Action dated Oct. 29, 2008, 54 pages.

(56) References Cited

OTHER PUBLICATIONS

U.S. Appl. No. 11/006,841: Response to Final Office Action dated Dec. 29, 2008, 45 pages.
U.S. Appl. No. 11/006,841: Advisory Action dated Jan. 6, 2009, 3 pages.
U.S. Appl. No. 11/006,841: RCE dated Apr. 23, 2009, 48 pages.
U.S. Appl. No. 11/006,841: Supplemental Response dated Jun. 26, 2009, 34 pages.
U.S. Appl. No. 11/006,841: Notice of Allowance dated Jun. 29, 2009, 40 pages.
U.S. Appl. No. 11/006,841: Issue Fee dated Sep. 29, 2009, 4 pages.
U.S. Appl. No. 11/006,841: Issue Notification dated Nov. 11, 2009, 1 page.
U.S. Appl. No. 12/578,411: Continuation application filed Oct. 13, 2009, 75 pages.
U.S. Appl. No. 12/578,411: Notice of Missing Parts dated Oct. 28, 2009, 6 pages.
U.S. Appl. No. 12/578,411: Response to Missing Parts dated Dec. 28, 2009, 25 pages.
U.S. Appl. No. 12/578,411: Filing Receipt dated Jan. 7, 2010, 3 pages.
U.S. Appl. No. 12/578,411: Notice of Publication dated Apr. 15, 2010, 1 page.
U.S. Appl. No. 12/578,411: Restriction requirement dated Jun. 8, 2011, 6 pages.
U.S. Appl. No. 12/578,411: Response to restriction requirement dated Jul. 6, 2011, 19 pages.
U.S. Appl. No. 12/578,411: Non-Final Office Action, dated Aug. 23, 2011, 19 pages.
U.S. Appl. No. 12/578,411: Non-Final Office Action response dated Dec. 22, 2011, 38 pages.
U.S. Appl. No. 12/578,411: Final Rejection dated Jan. 20, 2012, 16 pages.
U.S. Appl. No. 12/578,411: Amendment, dated May 21, 2012, 23 pages.
U.S. Appl. No. 12/578,411: Advisory Action, dated May 31, 2012, 4 pages.
U.S. Appl. No. 12/578,411: RCE, dated Jun. 12, 2012, 38 pages.
U.S. Appl. No. 12/578,411: Notice of Allowance, dated Aug. 19, 2013, 19 pages.
U.S. Appl. No. 12/578,411: Issue fee payment and Rule 312 amendment, dated Nov. 14, 2013, 14 pages.
U.S. Appl. No. 12/578,411: Examiner response to 312 amendment, dated Nov. 19, 2013, 2 pages.
U.S. Appl. No. 12/578,411: Response to Amendment under rule 312, dated Dec. 3, 2013, 3 pages.
U.S. Appl. No. 12/578,411: Issue Notification, dated Dec. 18, 2013, 1 page.
U.S. Appl. No. 14/086,837, filed Nov. 21, 2013, 68 Pages.
U.S. Appl. No. 14/086,837: Notice to File Missing Parts, dated Dec. 12, 2013, 5 Pages.
U.S. Appl. No. 14/086,837: Applicant Response to Pre-Exam Formalities Notice, dated Jun. 11, 2014, 26 Pages.
U.S. Appl. No. 14/086,837: Notice of Publication, dated Sep. 25, 2014, 4 Pages.
U.S. Appl. No. 14/086,837: Terminal Disclaimer, dated Nov. 14, 2014, 1 page.
U.S. Appl. No. 14/086,837: Examiner's search strategy and results, dated Dec. 2, 2014, 9 pages.
U.S. Appl. No. 14/086,837: Notice of Allowance and Fees, dated Dec. 2, 2014, 17 pages.
U.S. Appl. No. 14/086,837: Amendment After Notice of Allowance, dated Feb. 27, 2015, 9 pages.
U.S. Appl. No. 14/086,837: Issue Fee Payment, dated Feb. 27, 2015, 1 page.
U.S. Appl. No. 14/086,837: Issue Notification, dated May 6, 2015, 1 page.
U.S. Appl. No. 14/635,836, filed Mar. 2, 2015, 70 pages.
U.S. Appl. No. 14/635,836: Filing Receipt, dated Mar. 12, 2015, 3 pages.
U.S. Appl. No. 14/635,836: Notice to File Missing Parts, dated Mar. 12, 2015, 2 pages.
U.S. Appl. No. 14/635,836: Applicant Response to Pre-Exam Formalities Notice, dated May 12, 2015, 40 pages.
U.S. Appl. No. 14/635,836: Filing Receipt, dated May 19, 2015, 3 pages.
U.S. Appl. No. 14/635,836: Notice of Publication, dated Aug. 27, 2015, 1 page.
U.S. Appl. No. 14/635,836: Electronic Terminal Disclaimer Approved and Filed, dated Nov. 13, 2015, 3 pages.
U.S. Appl. No. 14/635,836: Notice of Allowance and Fees Due, dated Apr. 18, 2016, 25 pages.
U.S. Appl. No. 14/635,836: Issue Fee Payment and Amendment after NOA, dated Jul. 15, 2016, 15 pages.
U.S. Appl. No. 14/635,836: Response to Amendment under Rule 312, dated Jul. 21, 2016, 1 page.
U.S. Appl. No. 14/635,836: Response to Amendment under Rule 312, dated Jul. 22, 2016, 2 page.
U.S. Appl. No. 14/635,836: Issue Notification, dated Aug. 10, 2016, 1 page.
U.S. Appl. No. 15/250,118, filed Aug. 29, 2016, 71 pages.
U.S. Appl. No. 15/250,118: Preliminary Amendment, dated Aug. 29, 2016, 20 pages.
U.S. Appl. No. 15/250,118: Filing Receipt, dated Sep. 9, 2016, 3 pages.
U.S. Appl. No. 15/250,118: Applicant Response to Pre-Exam Formalities Notice, dated Nov. 8, 2016, 21 pages.
U.S. Appl. No. 15/250,118: Filing Receipt, dated Nov. 15, 2016, 3 pages.
U.S. Appl. No. 15/250,118: Notice of Publication, dated Feb. 23, 2017, 1 page.
U.S. Appl. No. 15/250,118: Non-Final Rejection, dated Jun. 15, 2017, 22 pages.
U.S. Appl. No. 15/250,118: Amendment/Req. Reconsideration-After Non-Final Reject, dated Sep. 14, 2017, 44 pages.
U.S. Appl. No. 11/006,440, filed Dec. 6, 2004, 85 pages.
U.S. Appl. No. 11/006,440: Notice to file missing parts dated Jan. 11, 2005, 2 pages.
U.S. Appl. No. 11/006,440: Response to Notice to file missing parts dated Mar. 15, 2005, 8 pages.
U.S. Appl. No. 11/006,440: Preliminary Amendment dated Apr. 28, 2005, 140 pages.
U.S. Appl. No. 11/006,440: Preliminary Amendment and Substitute Specification dated Oct. 10, 2006, 139 pages.
U.S. Appl. No. 11/006,440: Restriction Requirement dated Mar. 29, 2007, 5 pages.
U.S. Appl. No. 11/006,440: Response to Restriction Requirement dated Apr. 30, 2007, 42 pages.
U.S. Appl. No. 11/006,440: Non-Final Office Action dated Jun. 21, 2007, 15 pages.
U.S. Appl. No. 11/006,440: Response to Non-Final Office Action dated Nov. 20, 2007, 42 pages.
U.S. Appl. No. 11/006,440: Final Office Action dated Feb. 6, 2008, 13 pages.
U.S. Appl. No. 11/006,440: Response to Final Office Action dated Apr. 7, 2008, 34 pages.
U.S. Appl. No. 11/006,440: Advisory Action dated May 9, 2008, 3 pages.
U.S. Appl. No. 11/006,440: Notice of appeal mailed Aug. 4, 2008, 1 page.
U.S. Appl. No. 11/006,440: RCE dated Nov. 4, 2008, 39 pages.
U.S. Appl. No. 11/006,440: Final Office Action dated Jan. 23, 2009, 22 pages.
U.S. Appl. No. 11/006,440: Amendment after Final dated Apr. 23, 2009, 34 pages.
U.S. Appl. No. 11/006,440: Supplemental Amendment dated Jul. 17, 2009, 29 pages.
U.S. Appl. No. 11/006,440: Notice of Allowance dated Jul. 31, 2009, 15 pages.
U.S. Appl. No. 11/006,440: Examiner's Amendment and Reasons for Allowance dated Sep. 3, 2009, 9 pages.
U.S. Appl. No. 11/006,440: Issue Fee dated Nov. 2, 2009, 12 pages.

(56) References Cited

OTHER PUBLICATIONS

U.S. Appl. No. 11/006,440: Issue Notification dated Dec. 2, 2009, 1 page.
U.S. Appl. No. 12/627,816: Continuation application filed Nov. 30, 2009, 95 pages.
U.S. Appl. No. 12/627,816: Notice of Missing Parts dated Dec. 15, 2009, 2 pages.
U.S. Appl. No. 12/627,816: Response to Missing Parts dated Apr. 12, 2010, 21 pages.
U.S. Appl. No. 12/627,816: Filing Receipt dated Apr. 20, 2010, 3 pages.
U.S. Appl. No. 12/627,816: Notice of Publication dated Jul. 29, 2010, 1 page.
U.S. Appl. No. 12/627,816: Non-Final OA, dated May 5, 2011, 19 pages.
U.S. Appl. No. 12/627,816: Non-Final OA response, dated Nov. 7, 2011, 12 pages.
U.S. Appl. No. 12/627,816: Final Rejection dated Nov. 17, 2011, 18 pages.
U.S. Appl. No. 12/627,816: RCE dated Feb. 17, 2012, 20 pages.
U.S. Appl. No. 12/627,816: Terminal disclaimer review, dated Mar. 7, 2012, 1 page.
U.S. Appl. No. 12/627,816: Notice of Allowance, dated Aug. 1, 2013, 16 pages.
U.S. Appl. No. 12/627,816: Issue fee payment and Rule 312 amendment, dated Nov. 1, 2013, 14 pages.
U.S. Appl. No. 12/627,816: Examiner response to rule 312 amendment, dated Nov. 13, 2013, 2 pages.
U.S. Appl. No. 12/627,816: Issue Notification, dated Nov. 26, 2013, 1 page.
U.S. Appl. No. 14/086,808, filed Nov. 21, 2013, 87 Pages.
U.S. Appl. No. 14/086,808: Notice to File Missing Parts and Filing Receipt, dated Dec. 11, 2013, 5 Pages.
U.S. Appl. No. 14/086,808: Applicant Response to Pre-Exam Formalities Notice, dated Jun. 11, 2014, 53 Pages.
U.S. Appl. No. 14/086,808: Filing receipt, dated Jun. 17, 2014, 3 Pages.
U.S. Appl. No. 14/086,808: Notice of Publication, dated Sep. 25, 2014, 1 Page.
U.S. Appl. No. 14/086,808: Terminal Disclaimer, Filed Oct. 24, 2014, 2 pages.
U.S. Appl. No. 14/086,808: Terminal Disclaimer Review Decision, Mailed Oct. 29, 2014, 1 Page.
U.S. Appl. No. 14/086,808: Terminal Disclaimer, Filed Nov. 4, 2014, 2 pages.
U.S. Appl. No. 14/086,808: Terminal Disclaimer Review Decision, Mailed Nov. 13, 2014, 1 page.
U.S. Appl. No. 14/086,808: Examiner's search strategy and results, dated Nov. 17, 2014, 5 pages.
U.S. Appl. No. 14/086,808: Notice of Allowance and fees, dated Nov. 17, 2014, 16 pages.
U.S. Appl. No. 14/086,808: Issue Fee Payment and Rule 312 amendment, dated Feb. 17, 2015, 1 page.
U.S. Appl. No. 14/086,808: Amendment After Notice of Allowance, dated Feb. 17, 2015, 17 pages.
U.S. Appl. No. 14/086,808: Response to Amendment under Rule 312, dated Feb. 20, 2015, 2 pages.
U.S. Appl. No. 14/086,808: Response to Amendment under Rule 312, dated Feb. 25, 2015, 3 pages.
U.S. Appl. No. 14/086,808: Issue Notification, dated Mar. 18, 2015, 1 page.
U.S. Appl. No. 14/625,473, filed Feb. 18, 2015, 92 pages.
U.S. Appl. No. 14/625,473: Filing Receipt, dated Mar. 18, 2015, 3 pages.
U.S. Appl. No. 14/625,473: Notice to File Missing Parts, dated Mar. 18, 2015.
U.S. Appl. No. 14/625,473: Response to Pre-Exam Formalities Notice and Preliminary Amendment, dated May 18, 2015, 28 pages.
U.S. Appl. No. 14/625,473: Filing Receipt, dated May 20, 2015, 3 pages.
U.S. Appl. No. 14/625,473: Notice of Publication, dated Aug. 27, 2015, 1 page.
U.S. Appl. No. 14/625,473: Electronic Terminal Disclaimer Filed and Approved, Nov. 13, 2015, 3 pages.
U.S. Appl. No. 14/625,473: Notice of Allowance, dated Mar. 28, 2016, 19 pages.
U.S. Appl. No. 14/625,473: Issue Fee Payment and Amendments after Notice of Allowance, dated Jun. 28, 2016, 24 pages.
U.S. Appl. No. 14/625,473: Response to Amendment under Rule 312, dated Jun. 30, 2016, 1 page.
U.S. Appl. No. 14/625,473: Issue Notification, dated Jul. 20, 2016, 1 page.
U.S. Appl. No. 15/214,168: Application as filed with preliminary amendments, filed Jul. 19, 2016, 116 pages.
U.S. Appl. No. 15/214,168: Filing Receipt, dated Aug. 3, 2016, 4 pages.
U.S. Appl. No. 15/214,168: Corrected Filing Receipt, dated Oct. 12, 2016, 4 pages.
U.S. Appl. No. 15/214,168: Notice of Publication, dated Nov. 10, 2016, 1 page.
U.S. Appl. No. 15/214,168: Non-Final Rejection, dated Mar. 2, 2017, 20 pages.
U.S. Appl. No. 15/214,168: Amendment/Req. Reconsideration-After Non-Final Reject, dated Jun. 2, 2017, 39 pages.
U.S. Appl. No. 15/214,168: Terminal Disclaimer, dated Jul. 17, 2017, 4 pages.
U.S. Appl. No. 15/214,168: Notice of Allowance and Fees Due, dated Aug. 1, 2017, 26 pages.
U.S. Appl. No. 11/006,446, filed Dec. 6, 2004, 91 pages.
U.S. Appl. No. 11/006,446: Notice of Missing Parts dated Jan. 24, 2005, 3 pages.
U.S. Appl. No. 11/006,446: Response to Notice to File Missing Parts dated Mar. 29, 2005, 8 pages.
U.S. Appl. No. 11/006,446: Preliminary Amendment dated Apr. 28, 2005, 118 pages.
U.S. Appl. No. 11/006,446: Office Action—Restriction Requirement dated Apr. 4, 2007, 5 pages.
U.S. Appl. No. 11/006,446: Response to Office Action—Restriction Requirement dated May 3, 2007, 6 pages.
U.S. Appl. No. 11/006,446: Non-final Office Action dated Jul. 26, 2007, 45 pages.
U.S. Appl. No. 11/006,446: Amendment dated Nov. 26, 2007, 38 pages.
U.S. Appl. No. 11/006,446: Non-final Office Action dated Feb. 20, 2008, 67 pages.
U.S. Appl. No. 11/006,446: Amendment dated Jul. 21, 2008, 33 pages.
U.S. Appl. No. 11/006,446: Final Office Action dated Oct. 28, 2008, 49 pages.
U.S. Appl. No. 11/006,446: Amendment dated Dec. 29, 2008, 33 pages.
U.S. Appl. No. 11/006,446: Advisory Action dated Jan. 7, 2009, 4 pages.
U.S. Appl. No. 11/006,446: RCE with Amendment dated Apr. 28, 2009, 38 pages.
U.S. Appl. No. 11/006,446: Non-final Office Action dated Jul. 7, 2009, 41 pages.
U.S. Appl. No. 11/006,446: Examiner Interview Summary and Search Results dated Oct. 26, 2009, 6 pages.
U.S. Appl. No. 11/006,446: Amendment dated Dec. 7, 2009, 33 pages.
U.S. Appl. No. 11/006,446: Examiner Interview Summary dated Mar. 19, 2010, 4 pages.
U.S. Appl. No. 11/006,446: Notice of Allowance/Allowability dated Mar. 19, 2010, 29 pages.
U.S. Appl. No. 11/006,446: Issue Fee Payment and 312 Amendment dated Jun. 21, 2010, 23 pages.
U.S. Appl. No. 11/006,446: Rule 312 Amendment dated Aug. 19, 2010, 2 pages.
U.S. Appl. No. 11/006,446: Formal drawings dated Aug. 25, 2010, 29 pages.
U.S. Appl. No. 11/006,446: Issue Notification dated Sep. 1, 2010, 1 page.

(56) References Cited

OTHER PUBLICATIONS

U.S. Appl. No. 12/830,236, filed Jul. 2, 2010, 103 pages.
U.S. Appl. No. 12/830,236: Notice to File Corrected Application Papers dated Jul. 16, 2010, 5 pages.
U.S. Appl. No. 12/830,236: Response to Notice to File Corrected Application Papers dated Aug. 25, 2010, 32 pages.
U.S. Appl. No. 12/830,236: Filing receipt dated Sep. 3, 2010, 3 pages.
U.S. Appl. No. 12/830,236: Notice of Publication dated Dec. 16, 2010, 1 page.
U.S. Appl. No. 12/830,236: Restriction requirement dated Mar. 18, 2011, 6 pages.
U.S. Appl. No. 12/830,236: Restriction requirement response, dated Apr. 18, 2011, 5 pages.
U.S. Appl. No. 12/830,236: Non-Final Office Action, dated May 11, 2011, 10 pages.
U.S. Appl. No. 12/830,236: Response to Non-Final Office Action dated Jul. 6, 2011, 18 pages.
U.S. Appl. No. 12/830,236: Final Office Action, dated Oct. 14, 2011, 18 pages.
U.S. Appl. No. 12/830,236: Amendment after final, dated Jan. 17, 2012, 26 pages.
U.S. Appl. No. 12/830,236: Advisory Action, dated Feb. 8, 2012, 6 pages.
U.S. Appl. No. 12/830,236: Notice of Appeal dated Mar. 8, 2012, 3 pages.
U.S. Appl. No. 12/830,236: RCE, dated Jun. 5, 2012, 23 pages.
U.S. Appl. No. 12/830,236: Non-Final Office Action, dated Jul. 31, 2012, 18 pages.
U.S. Appl. No. 12/830,236: Amendment, dated Nov. 1, 2012, 27 pages.
U.S. Appl. No. 12/830,236: Final Office Action, dated Feb. 27, 2013, 35 pages.
U.S. Appl. No. 12/830,236: Response after final, dated Jun. 27, 2013, 36 pages.
U.S. Appl. No. 12/830,236: Advisory action, dated Jul. 12, 2013, 4 pages.
U.S. Appl. No. 12/830,236: Notice of appeal, dated Jul. 19, 2013, 2 pages.
U.S. Appl. No. 12/830,236: Appeal brief, dated Sep. 18, 2013, 44 pages.
U.S. Appl. No. 12/830,236: Examiners answer to appeal brief, dated Dec. 18, 2013, 35 pages.
U.S. Appl. No. 12/830,236: Reply Brief as Filed on Feb. 18, 2014, 16 Pages.
U.S. Appl. No. 12/830,236: Appeal Docketing Notice, Mailed Mar. 21, 2014, 2 Pages.
U.S. Appl. No. 12/830,236: Patent Board Decision, Mar. 9, 2016, 6 pages.
U.S. Appl. No. 12/830,236: RCE and Amendments, dated Apr. 27, 2016, 15 pages.
U.S. Appl. No. 12/830,236: Non-Final Rejection and Examiner Search, dated Jun. 29, 2016, 75 pages.
U.S. Appl. No. 12/830,236: Amendment/Req. Reconsideration-After Non-Final Reject, dated Sep. 6, 2016, 12 pages.
U.S. Appl. No. 12/830,236: Final Rejection, dated Dec. 14, 2016, 22 pages.
U.S. Appl. No. 12/830,236: Response After Final Action, dated Feb. 13, 2017, 14 pages.
U.S. Appl. No. 12/830,236: Advisory Action, dated Mar. 3, 2017, 2 pages.
U.S. Appl. No. 12/830,236: RCE and Amendments, dated Apr. 14, 2017, 17 pages.
U.S. Appl. No. 12/830,236: Non-Final Rejection, dated Jun. 21, 2017, 30 pages.
U.S. Appl. No. 12/830,236: Amendment/Req. Reconsideration-After Non-Final Reject, dated Oct. 23, 2017, 18 pages.
U.S. Appl. No. 11/385,257, filed Mar. 20, 2006, 118 pages.
U.S. Appl. No. 11/385,257: Notice of Missing Parts dated May 3, 2006, 2 pages.
U.S. Appl. No. 11/385,257: Response to Missing Parts dated Aug. 3, 2006, 46 pages.
U.S. Appl. No. 11/385,257: Notice of Publication dated Nov. 30, 2006, 1 page.
U.S. Appl. No. 11/385,257: Non-final Office Action dated Apr. 29, 2008, 44 pages.
U.S. Appl. No. 11/385,257: Amendment dated Jul. 29, 2008, 29 pages.
U.S. Appl. No. 11/385,257: Final Office Action dated Dec. 9, 2008, 47 pages.
U.S. Appl. No. 11/385,257: RCE with Amendment dated May 11, 2009, 38 pages.
U.S. Appl. No. 11/385,257: Supplemental Amendment dated May 26, 2009, 32 pages.
U.S. Appl. No. 11/385,257: Notice of Non-Compliant Amendment dated Jun. 1, 2009, 3 pages.
U.S. Appl. No. 11/385,257: Amendment dated Jun. 30, 2009, 34 pages.
U.S. Appl. No. 11/385,257: Non-final Office Action dated Sep. 14, 2009, 60 pages.
U.S. Appl. No. 11/385,257: Response to Non-Final Office Action dated Jan. 13, 2010, 34 pages.
U.S. Appl. No. 11/385,257: Final Office Action dated Apr. 12, 2010, 47 pages.
U.S. Appl. No. 11/385,257: RCE dated Aug. 12, 2010, 35 pages.
U.S. Appl. No. 11/385,257: Office Action dated Sep. 30, 2010, 39 pages.
U.S. Appl. No. 11/385,257: Office Action response, dated Mar. 29, 2011, 31 pages.
U.S. Appl. No. 11/385,257: Final Rejection dated Jun. 1, 2011, 40 pages.
U.S. Appl. No. 11/385,257: Request for continued Examination dated Nov. 1, 2011, 30 pages.
U.S. Appl. No. 11/385,257: Non-Final Office Action, dated Jan. 9, 2012, 40 pages.
U.S. Appl. No. 11/385,257: Amendment, dated Apr. 6, 2012, 30 pages.
U.S. Appl. No. 11/385,257: Notice of allowance and Examiner interview summary, dated Jun. 22, 2012, 36 pages.
U.S. Appl. No. 11/385,257: Office communication concerning previous IDS filing, dated Oct. 4, 2012, 4 pages.
U.S. Appl. No. 11/385,257: Miscellaneous Communication to Applicant, dated Oct. 15, 2012, 3 pages.
U.S. Appl. No. 11/385,257: Rule 312 Amendment, dated Dec. 12, 2012, 10 pages.
U.S. Appl. No. 11/385,257: Issue Notification, dated Dec. 22, 2012, 1 page.
U.S. Appl. No. 13/625,812, filed Sep. 24, 2012, 123 pages.
U.S. Appl. No. 13/625,812: Notice to file missing parts, dated Oct. 15, 2012, 6 pages.
U.S. Appl. No. 13/625,812: Response to Notice to file missing parts and preliminary amendment, dated Mar. 8, 2013, 47 pages.
U.S. Appl. No. 13/625,812: Notice of incomplete reply, dated Mar. 15, 2013, 3 pages.
U.S. Appl. No. 13/625,812: Response to incomplete reply notice, dated Apr. 2, 2013, 5 pages.
U.S. Appl. No. 13/625,812: Non-Final office action, dated Jul. 26, 2013, 29 pages.
U.S. Appl. No. 13/625,812: Publication notice, dated Aug. 1, 2013, 1 page.
U.S. Appl. No. 13/625,812: Response to non-final office action, dated Oct. 9, 2013, 15 pages.
U.S. Appl. No. 13/625,812: Final rejection, dated Dec. 3, 2013, 28 pages.
U.S. Appl. No. 13/625,812: Response After Final Action, dated Apr. 1, 2014, 1 Page.
U.S. Appl. No. 13/625,812: Advisory Action (PTOL-303), dated Apr. 9, 2014, 3 Pages.
U.S. Appl. No. 13/625,812: Notice of Appeal, dated May 5, 2014, 1 Page.
U.S. Appl. No. 13/625,812: Request for Continued Examination, dated Aug. 4, 2014, 18 Pages.

(56) References Cited

OTHER PUBLICATIONS

U.S. Appl. No. 13/625,812: Request for Corrected Filing Receipt, dated Aug. 21, 2014, 6 Pages.
U.S. Appl. No. 13/625,812: Filing Receipt, dated Aug. 27, 2014, 3 Pages.
U.S. Appl. No. 13/625,812: Notice of Allowance and Fees, dated Dec. 9, 2014, 20 pages.
U.S. Appl. No. 13/625,812: Filing Receipt, dated Feb. 2, 2015, 3 pages.
U.S. Appl. No. 13/625,812: Filing Receipt, dated Feb. 6, 2015, 3 pages.
U.S. Appl. No. 13/625,812: Terminal Disclaimer Filed Mar. 2, 2015, 1 page.
U.S. Appl. No. 13/625,812: Post Allowance Arguments/Amendments, dated Mar. 6, 2015, 6 pages.
U.S. Appl. No. 13/625,812: Amendment After Notice of Allowance, dated Mar. 9, 2015, 3 pages.
U.S. Appl. No. 13/625,812: Issue Fee Payment, dated Mar. 9, 2015, 1 page.
U.S. Appl. No. 13/625,812: Terminal Disclaimer Review Decision, mailed Mar. 12, 2015.
U.S. Appl. No. 14/641,735, filed Mar. 9, 2015, 126 pages.
U.S. Appl. No. 14/641,735: Filing Receipt, dated Mar. 20, 2015, 3 pages.
U.S. Appl. No. 14/641,735: Notice to File Missing Parts, dated Mar. 20, 2015, 2 pages.
U.S. Appl. No. 14/641,735: Notice of Incomplete Reply, dated Jun. 26, 2015, 2 pages.
U.S. Appl. No. 14/641,735: Applicant Response to Pre-Exam Formalities Notice and Amendments, dated Jul. 8, 2015, 32 pages.
U.S. Appl. No. 14/641,735: Electronic Terminal Disclaimer, filed Aug. 27, 2015, 3 pages.
U.S. Appl. No. 14/641,735: Notice of Publication, dated Oct. 29, 2015, 1 page.
U.S. Appl. No. 14/641,735: Preliminary Amendment, dated Jan. 14, 2016, 8 pages.
U.S. Appl. No. 14/641,735: Non-Final Rejection, dated Jul. 14, 2017, 14 pages.
U.S. Appl. No. 14/641,735: Letter Restarting Period for Response, dated Aug. 24, 2017, 22 pages.
U.S. Appl. No. 11/319,758, filed Dec. 27, 2005, 79 pages.
U.S. Appl. No. 11/319,758: Notice of Missing Parts dated Feb. 1, 2006, 2 pages.
U.S. Appl. No. 11/319,758: Response to Missing Parts dated Jul. 3, 2006, 15 pages.
U.S. Appl. No. 11/319,758: Non-final Office Action dated Nov. 12, 2008, 46 pages.
U.S. Appl. No. 11/319,758: Amendment dated May 12, 2009, 40 pages.
U.S. Appl. No. 11/319,758: Final Office Action dated Aug. 3, 2009, 39 pages.
U.S. Appl. No. 11/319,758: RCE dated Jan. 4, 2010, 45 pages.
U.S. Appl. No. 11/319,758: Non-Final Office Action dated Mar. 30, 2010, 39 pages.
U.S. Appl. No. 11/319,758: Office Action response dated Jul. 29, 2010, 30 pages.
U.S. Appl. No. 11/319,758: Final Office Action dated Oct. 28, 2010, 31 pages.
U.S. Appl. No. 11/319,758: Request for Continued Examination, dated Mar. 28, 2011, 32 pages.
U.S. Appl. No. 11/319,758: Amendment after final, dated May 17, 2012, 34 pages.
U.S. Appl. No. 11/319,758: Advisory Action, dated Jun. 20, 2012, 3 pages.
U.S. Appl. No. 11/319,758: Final Office Action, dated Jan. 17, 2012, 22 pages.
U.S. Appl. No. 11/319,758: Amendment after final, dated Jun. 28, 2012, 29 pages.
U.S. Appl. No. 11/319,758: Notice of Allowance and examiner's interview summary, dated Jul. 17, 2012, 10 pages.
U.S. Appl. No. 11/319,758: Issue Fee payment, Rule 312 and Miscellaneous Communication, dated Oct. 12, 2012, 12 pages.
U.S. Appl. No. 11/319,758: Issue Notification, dated Oct. 31, 2012, 1 page.
U.S. Appl. No. 13/632,581, filed Oct. 1, 2012, 88 Pages.
U.S. Appl. No. 13/632,581: Notice to File Missing Parts and Filing Receipt, dated Oct. 22, 2012, 27 Pages.
U.S. Appl. No. 13/632,581: Filing Receipt, dated 3/5/4, 3 Pages.
U.S. Appl. No. 13/632,581: Notice of Publication, dated Jun. 13, 2013, 1 Page.
U.S. Appl. No. 13/632,581: Non-final Office Action, dated Jul. 3, 2013, 22 Pages.
U.S. Appl. No. 13/632,581: Non-Final Office Action Response, dated Sep. 11, 2013, 23 Pages.
U.S. Appl. No. 13/632,581: Final Office Action, dated Dec. 18, 2013, 27 Pages.
U.S. Appl. No. 13/632,581: Response After Final Action, dated Mar. 18, 2014, 37 Pages.
U.S. Appl. No. 13/632,581: Advisory Action (PTOL-303), dated Apr. 3, 2014, 4 Pages.
U.S. Appl. No. 13/632,581: Notice of Appeal dated Jul. 17, 2014, 2 Pages.
U.S. Appl. No. 13/632,581: Request for Continued Examination, dated Jul. 16, 2014, 23 Pages.
U.S. Appl. No. 13/632,581: Notice Non-Compliant Amendment, dated Oct. 20, 2014, 5 pages.
U.S. Appl. No. 13/632,581: Amendment/Req Reconsideration after Non-Final Reject, dated Nov. 4, 2014, 16 pages.
U.S. Appl. No. 13/632,581: Non-Final Rejection, dated Jan. 27, 2015, 16 pages.
U.S. Appl. No. 13/632,581: Amendment/Req Reconsideration Non-Final Rejection and Amendments, dated Apr. 20, 2015, 24 pages.
U.S. Appl. No. 13/632,581: dated Jul. 20, 2015, 21 pages.
U.S. Appl. No. 13/632,581: After Final Consideration Request and Response, dated Sep. 21, 2015, 28 pages.
U.S. Appl. No. 13/632,581: Advisory Action and After Final Decision, dated Oct. 2, 2015, 18 pages.
U.S. Appl. No. 13/632,581: RCE and Amendments, dated Nov. 30, 2015, 55 pages.
U.S. Appl. No. 13/632,581: Notice of Allowance and Fees, dated Dec. 17, 2015, 5 pages.
U.S. Appl. No. 13/632,581: Filing Receipt, dated Jan. 22, 2016, 4 pages.
U.S. Appl. No. 13/632,581: Electronic Terminal Disclaimer, dated Mar. 7, 2016, 3 pages.
U.S. Appl. No. 13/632,581: Issue Fee Payment, dated Mar. 16, 2016, 1 page.
U.S. Appl. No. 13/632,581: Amendment after Notice of Allowance, dated Mar. 16, 2016 19 pages.
U.S. Appl. No. 13/632,581: Response to Amendment under Rule 312, dated Mar. 22, 2016, 2 pages.
U.S. Appl. No. 13/632,581: Issue Notification, dated Apr. 13, 2016, 1 page.
U.S. Appl. No. 15/081,612, filed Mar. 25, 2016, 87 Pages.
U.S. Appl. No. 15/081,612: Notice to File Missing Parts and Filing Receipt, dated Apr. 11, 2016, 4 Pages.
U.S. Appl. No. 15/081,612: Filing Receipt, dated Apr. 11, 2016, 3 Pages.
U.S. Appl. No. 15/081,612: Applicant Response to Pre-Exam Formalities Notice and Preliminary Amendments, dated Jun. 13, 2016, 34 pages.
U.S. Appl. No. 15/081,612: Preliminary Amendment, dated Jun. 14, 2016, 4 pages.
U.S. Appl. No. 15/081,612: Filing Receipt, dated Jun. 21, 2016, 3 pages.
U.S. Appl. No. 15/081,612: Non-Final Rejection, dated Jul. 27, 2016, 9 pages.
U.S. Appl. No. 15/081,612: Electronic Terminal Disclaimer, dated Sep. 23, 2016, 3 pages.
U.S. Appl. No. 15/081,612: Notice of Publication, dated Sep. 29, 2016, 1 page.
U.S. Appl. No. 15/081,612: Amendment/Req. Reconsideration-After Non-Final Reject, dated Oct. 17, 2016, 10 pages.

(56) References Cited

OTHER PUBLICATIONS

U.S. Appl. No. 15/081,612: Notice of Allowance and Fees, dated Oct. 27, 2016, 5 pages.
U.S. Appl. No. 15/081,612: RCE, dated Jan. 30, 2017, 2 pages.
U.S. Appl. No. 15/081,612: Issue Fee Payment, dated Jan. 30, 2017, 1 page.
U.S. Appl. No. 15/081,612: Notice of Allowance and Fees Due, dated Jan. 30, 2017, 2 pages.
U.S. Appl. No. 15/081,612: Notice of Allowance and Fees Due, dated Feb. 13, 2017, 7 pages.
U.S. Appl. No. 15/081,612: Amendment After Notice of Allowance, dated Mar. 20, 2017, 4 pages.
U.S. Appl. No. 15/081,612: Issue Fee Payment, dated Mar. 20, 2017, 1 page.
U.S. Appl. No. 15/081,612: Issue Notification, dated Apr. 20, 2017, 1 page.
U.S. Appl. No. 15/464,295, filed Mar. 20, 2017, 84 pages.
U.S. Appl. No. 15/464,295: Notice to File Missing Parts, dated Mar. 28, 2017, 5 pages.
U.S. Appl. No. 15/464,295: Applicant Response to Pre-Exam Formalities Notice, dated May 31, 2017, 86 pages.
U.S. Appl. No. 15/464,295: Filing Receipt, dated Mar. 28, 2017, 4 pages.
U.S. Appl. No. 15/464,295: Preliminary Amendment, dated May 31, 2017, 8 pages.
U.S. Appl. No. 15/464,295: Filing Receipt, dated Jun. 2, 2017, 4 pages.
U.S. Appl. No. 11/006,842, filed Dec. 7, 2004, 58 pages.
U.S. Appl. No. 11/006,842: Notice to file missing parts dated Jan. 10, 2005, 2 pages.
U.S. Appl. No. 11/006,842: Response to Notice to file missing parts dated Apr. 1, 2005, 7 pages.
U.S. Appl. No. 11/006,842: Preliminary Amendment dated May 2, 2005, 93 pages.
U.S. Appl. No. 11/006,842: Restriction Requirement dated Jan. 23, 2008, 5 pages.
U.S. Appl. No. 11/006,842: Response to Restriction Requirement dated Feb. 25, 2008, 25 pages.
U.S. Appl. No. 11/006,842: Restriction Requirement dated May 13, 2008, 5 pages.
U.S. Appl. No. 11/006,842: Response to Restriction Requirement dated Aug. 13, 2008, 24 pages.
U.S. Appl. No. 11/006,842: Non-Final Office Action dated Nov. 3, 2008.
U.S. Appl. No. 11/006,842: Response to Non-Final Office Action dated May 4, 2009, 35 pages.
U.S. Appl. No. 11/006,842: Supplemental Response dated Jul. 17, 2009, 23 pages.
U.S. Appl. No. 11/006,842: Notice of Allowance dated Jul. 27, 2009, 13 pages.
U.S. Appl. No. 11/006,842: Issue Fee dated Oct. 27, 2009, 1 page.
U.S. Appl. No. 11/006,842: Issue notification dated Nov. 18, 2009, 1 page.
U.S. Appl. No. 12/613,450: Continuation application filed Nov. 5, 2009, 63 pages.
U.S. Appl. No. 12/613,450: Notice of Missing Parts dated Nov. 18, 2009, 2 pages.
U.S. Appl. No. 12/613,450: Preliminary Amendment and Response to Missing Parts filed Jan. 19, 2010, 16 pages.
U.S. Appl. No. 12/613,450: Filing receipt dated Jan. 27, 2010, 3 pages.
U.S. Appl. No. 12/613,450: Notice of Publication dated May 6, 2010, 1 page.
U.S. Appl. No. 12/613,450: Restriction requirement dated Jun. 10, 2011, 5 pages.
U.S. Appl. No. 12/613,450: Response to restriction requirement dated Jul. 6, 2011, 17 pages.
U.S. Appl. No. 12/613,450: Non-Final Office Action, dated Aug. 25, 2011, 15 pages.
U.S. Appl. No. 12/613,450: Non-Final OA response dated Dec. 27, 2011, 28 pages.
U.S. Appl. No. 12/613,450: Final rejection, dated Feb. 14, 2012, 14 pages.
U.S. Appl. No. 12/613,450: Amendment after final, dated Jun. 8, 2012, 23 pages.
U.S. Appl. No. 12/613,450: Advisory Action, mailed 6/20/12, 4 pages.
U.S. Appl. No. 12/613,450: RCE, dated Jul. 12, 2012, 25 pages.
U.S. Appl. No. 12/613,450: Notice of Allowance, dated Oct. 7, 2013, 20 pages.
U.S. Appl. No. 12/613,450: Electronic Terminal Disclaimer filed and approved, Jan. 2, 2014, 2 pages.
U.S. Appl. No. 12/613,450: Amendment After Final or Under 37CFR 1.312, initialed by the Examiner, dated Jan. 14, 2014, 2 Pages.
U.S. Appl. No. 12/613,450: Issue Notification, dated Jan. 22, 2014, 1 Page.
U.S. Appl. No. 14/149,749, filed Jan. 7, 2014, 59 Pages.
U.S. Appl. No. 14/149,749: Notice to File Missing Parts and Filing Receipt, dated Jan. 23, 2014, 6 Pages.
U.S. Appl. No. 14/149,749: Applicant Response to Pre-exam Formalities Notice, dated May 23, 2014 12 Pages.
U.S. Appl. No. 14/149,749: Applicant Response to Pre-Exam Formalities Notice, dated Aug. 25, 2014, 103 Pages.
U.S. Appl. No. 14/149,749: Filing Receipt, dated Sep. 4, 2014, 3 Pages.
U.S. Appl. No. 14/149,749: Notice of Publication, dated Dec. 11, 2014, 1 page.
U.S. Appl. No. 14/149,749: Electronic Terminal Disclaimer Filed and Approved Feb. 23, 2015.
U.S. Appl. No. 14/149,749: Examiner Initiated Interview Summary, dated Feb. 24, 2015, 2 pages.
U.S. Appl. No. 14/149,749: Notice of Allowance and Fees and Examiner Search, dated Apr. 17, 2015, 30 pages.
U.S. Appl. No. 14/149,749: Amendment after Notice of Allowance, dated May 27, 2015, 10 pages.
U.S. Appl. No. 14/149,749: Issue Fee Payment, dated May 27, 2015, 1 page.
U.S. Appl. No. 14/149,749: Electronic Terminal Disclaimer Filed and Approved, May 27, 2015, 3 pages.
U.S. Appl. No. 14/149,749: Response to Amendment under Rule 312, dated May 29, 2015, 1 page.
U.S. Appl. No. 14/149,749: Response to Amendment under Rule 312, dated Jun. 1, 2015, 3 pages.
U.S. Appl. No. 14/149,749: Issue Notification, dated Jun. 17, 2015, 1 page.
U.S. Appl. No. 14/726,192, filed May 29, 2015, 39 pages.
U.S. Appl. No. 14/726,192: Filing Receipt, dated Jun. 9, 2015, 3 pages.
U.S. Appl. No. 14/726,192: Notice to File Missing Parts, dated Jun. 9, 2015, 2 pages.
U.S. Appl. No. 14/726,192: Applicant Response to Pre-Exam Formalities Notice and Amendments, dated Aug. 12, 2015, 114 pages.
U.S. Appl. No. 14/726,192: Filing Receipt, dated Aug. 20, 2015, 3 pages.
U.S. Appl. No. 14/726,192: Electronic Terminal Disclaimer Filed and Approved, Nov. 20, 2015, 3 pages.
U.S. Appl. No. 14/726,192: Notice of Publication, dated Nov. 27, 2015, 1 page.
U.S. Appl. No. 14/726,192: Issue Fee Payment and Amendment after Notice of Allowance, dated Jul. 18, 2016, 13 pages.
U.S. Appl. No. 14/726,192: Response to Amendment under Rule 312, dated Jul. 21, 2016, 1 page.
U.S. Appl. No. 14/726,192: Response to Amendment under Rule 312, dated Jul. 22, 2016, 2 pages.
U.S. Appl. No. 14/726,192: Issue Notification, dated Aug. 3, 2016, 1 page.
U.S. Appl. No. 15/240,964: Application and Preliminary Amendments as filed Aug. 18, 2016, 70 pages.
U.S. Appl. No. 15/240,964: Filing Receipt, dated Aug. 31, 2016, 3 pages.

(56) References Cited

OTHER PUBLICATIONS

U.S. Appl. No. 15/240,964: Notice of Publication, dated Dec. 8, 2016.
U.S. Appl. No. 15/240,964: Non-Final Rejection, dated Mar. 14, 2017, 23 pages.
U.S. Appl. No. 15/240,964: Amendment/Req. Reconsideration—After Non-Final Reject, dated Jun. 14, 2017, 27 pages.
U.S. Appl. No. 15/240,964: Final Rejection, dated Aug. 9, 2017, 25 pages.
U.S. Appl. No. 15/240,964: After Final Consideration Program Request, Oct. 10, 2017, 30 pages.
U.S. Appl. No. 15/240,964: Advisory Action, dated Oct. 30, 2017, 3 pages.
U.S. Appl. No. 11/320,538, filed Dec. 27, 2005, 76 pages.
U.S. Appl. No. 11/320,538: Notice of Missing Parts dated Feb. 2, 2006, 2 pages.
U.S. Appl. No. 11/320,538: Response to Missing Parts dated Aug. 2, 2006, 36 pages.
U.S. Appl. No. 11/320,538: Non-final Office Action dated Apr. 1, 2009, 27 pages.
U.S. Appl. No. 11/320,538: Amendment dated Jul. 1, 2009, 54 pages.
U.S. Appl. No. 11/320,538: Final Office Action dated Nov. 2, 2009, 29 pages.
U.S. Appl. No. 11/320,538: Response to Final Office Action dated Jan. 4, 2010, 23 pages.
U.S. Appl. No. 11/320,538: Advisory Action dated Jan. 19, 2010, 3 pages.
U.S. Appl. No. 11/320,538: RCE and Amendment dated Apr. 2, 2010, 26 pages.
U.S. Appl. No. 11/320,538: Non-Final Office Action dated Jun. 9, 2010, 24 pages.
U.S. Appl. No. 11/320,538: Office action dated Dec. 22, 2010, 10 pages.
U.S. Appl. No. 11/320,538: Notice of Appeal, dated May 23, 2011, 6 pages.
U.S. Appl. No. 11/320,538: Pre-brief appeal conference decision dated Jun. 30, 2011, 2 pages.
U.S. Appl. No. 11/320,538: Request for Continued Examination dated Dec. 23, 2011, 21 pages.
U.S. Appl. No. 11/320,538: Non-Final Office Action, dated Dec. 19, 2012, 12 pages.
U.S. Appl. No. 11/320,538: Response to Non-final office action, dated Apr. 17, 2013, 20 pages.
U.S. Appl. No. 11/320,538: Notice of allowance, dated Aug. 1, 2013, 25 pages.
U.S. Appl. No. 11/320,538: Issue fee payment, dated Nov. 1, 2013, 7 pages.
U.S. Appl. No. 11/320,538: Rule 312 amendment, dated Nov. 19, 2013, 20 pages.
U.S. Appl. No. 11/320,538: Issue Notification, dated Dec. 4, 2013, U.S. Appl. No. 14/086,741, filed Dec. 12, 2013, 77 Pages.
U.S. Appl. No. 14/086,741: Filing Receipt and Notice to File Missing Parts, dated Dec. 12, 2013, 6 Pages.
U.S. Appl. No. 14/086,741: Applicant Response to Pre-Exam Formalities Notice, dated Jun. 12, 2014, 60 Pages.
U.S. Appl. No. 14/086,741: Filing Receipt, dated Jun. 17, 2014, 3 Pages.
U.S. Appl. No. 14/086,741: Notice of Publication, dated Sep. 25, 2014, 1 Page.
U.S. Appl. No. 14/086,741: Terminal Disclaimer as Filed on Sep. 29, 2014, 1 Page.
U.S. Appl. No. 14/086,741: Terminal Disclaimer Review Decision, Mailed Sep. 30, 2014, 1 Page.
U.S. Appl. No. 14/086,741: Notice of Allowance and Fees and Examiner Summary, dated Oct. 3, 2014, 21 pages.
U.S. Appl. No. 14/086,741: Notice of Allowance and Fees Due, dated Oct. 3, 2014, 22 pages.
U.S. Appl. No. 14/086,741: Amendment after Notice of Allowance, dated Jan. 5, 2015, 14 pages.
U.S. Appl. No. 14/086,741: Issue Fee Payment, dated Jan. 5, 2015, 1 page.
U.S. Appl. No. 14/086,741: Response to Amendment under Rule 312, dated Jan. 22, 2015, 2 pages.
U.S. Appl. No. 14/086,741: Notice of Allowance and Fees and Examiner Search strategy, dated Mar. 16, 2015, 40 pages.
U.S. Appl. No. 14/086,741: Issue Notification, dated Apr. 1, 2015, 1 page.
U.S. Appl. No. 14/596,154, filed Jan. 13, 2015, 60 pages.
U.S. Appl. No. 14/596,154: Filing Receipt, dated Jan. 27, 2015, 3 pages.
U.S. Appl. No. 14/596,154: Notice to File Missing Parts, dated Jan. 27, 2015, 3 pages.
U.S. Appl. No. 14/596,154: Applicant Response to Pre Exam Formalities Notice with Preliminary Amendments, dated Mar. 27, 2015, 85 pages.
U.S. Appl. No. 14/596,154: Filing Receipt, dated Apr. 2, 2015, 3 pages.
U.S. Appl. No. 14/596,154: Notice of Publication, dated Jul. 9, 2015, 1 page.
U.S. Appl. No. 14/596,154: Electronic Terminal Disclaimer Filed and Approved, dated Nov. 20, 2015, 3 pages.
U.S. Appl. No. 14/596,154: Non-Final Rejection, dated Sep. 21, 2017, 19 pages.
U.S. Appl. No. 11/361,500, filed Feb. 23, 2006, 72 pages.
U.S. Appl. No. 11/361,500: Notice to file missing parts dated Mar. 23, 2006, 2 pages.
U.S. Appl. No. 11/361,500: Response to Notice to File Missing Parts dated Jul. 19, 2006, 27 pages.
U.S. Appl. No. 11/361,500: Notice of Publication dated Nov. 16, 2006, 1 page.
U.S. Appl. No. 11/361,500: Office Action dated May 27, 2009, 18 pages.
U.S. Appl. No. 11/361,500: Response to Office Action dated Aug. 27, 2009, 34 pages.
U.S. Appl. No. 11/361,500: Notice of Allowance dated Dec. 11, 2009, 8 pages.
U.S. Appl. No. 11/361,500: Issue Fee Payment and Rule 312 Amendment dated Jan. 6, 2010, 28 pages.
U.S. Appl. No. 11/361,500: Response to Rule 312 Amendment dated Jan. 25, 2010, 4 pages.
U.S. Appl. No. 11/361,500: Issue Notification dated Feb. 24, 2010, 1 page.
U.S. Appl. No. 12/702,243: Continuation Application with Preliminary Amendment filed Feb. 8, 2010, 83 pages.
U.S. Appl. No. 12/702,243: Notice of Missing Parts dated Feb. 25, 2010, 2 pages.
U.S. Appl. No. 12/702,243: Response to Missing Parts dated Apr. 26, 2010, 8 pages.
U.S. Appl. No. 12/702,243: Filing receipt dated May 4, 2010, 3 pages.
U.S. Appl. No. 12/702,243: Notice of Publication dated Aug. 12, 2010, 1 page.
U.S. Appl. No. 12/702,243: Non-Final rejection, dated Aug. 30, 2012, 8 pages.
U.S. Appl. No. 12/702,243: Amendment, dated Nov. 20, 2012, 14 pages.
U.S. Appl. No. 12/702,243: Terminal Disclaimer, dated Jan. 2, 2013, 5 pages.
U.S. Appl. No. 12/702,243: Terminal Disclaimer decision, dated Jan. 4, 2013, 1 p. 1.
U.S. Appl. No. 12/702,243: Notice of allowance and fees due and examiner interview summary, dated Jan. 10, 2013, pages.
U.S. Appl. No. 12/702,243: Issue notification, dated Apr. 24, 2013, 1 page.
U.S. Appl. No. 13/860,482, filed Apr. 10, 2013, 98 Pages.
U.S. Appl. No. 13/860,482: Notice to File Missing Parts and Filing Receipt, dated May 21, 2013, 5 Pages.
U.S. Appl. No. 13/860,482: Applicant Response to Pre-Exam Formalities Notice, dated Oct. 22, 2013, 3 Pages.
U.S. Appl. No. 13/860,482: Notice of Publication, dated Feb. 6, 2014, 1 Page.

(56) References Cited

OTHER PUBLICATIONS

U.S. Appl. No. 13/860,482: Non-Final Office Action, dated Jun. 9, 2014, 11 Pages.
U.S. Appl. No. 13/860,482: Non-Final Office Action Response, dated Sep. 8, 2014, 19 Pages.
U.S. Appl. No. 13/860,482: Terminal Disclaimer Review Decision, Sep. 9, 2014, 1 page.
U.S. Appl. No. 13/860,482: Terminal Disclaimer Filed, Oct. 8, 2014, 1 page.
U.S. Appl. No. 13/860,482: Terminal Disclaimer Review Decision, Oct. 9, 2014, 1 page.
U.S. Appl. No. 13/860,482: Notice of Allowance and Fees Due, dated Nov. 5, 2014, 8 Pages.
U.S. Appl. No. 13/860,482: Issue Fee Payment and Rule 312 Amendments, dated Feb. 4, 2015, 4 pages.
U.S. Appl. No. 13/860,482: Issue Notification, dated Mar. 4, 2015, 1 page.
U.S. Appl. No. 14/614,292, filed Feb. 4, 2015, 76 pages.
U.S. Appl. No. 14/614,292: Notice to File Missing Parts and Filing Receipt, dated Feb. 20, 2015, 5 pages.
U.S. Appl. No. 14/614,292: Applicant Response to Pre-Exam Formalities Notice and Amendments, dated Apr. 17, 2015, 30 pages.
U.S. Appl. No. 14/614,292: Filing Receipt, dated Apr. 24, 2015, 3 pages.
U.S. Appl. No. 14/614,292: Notice of Publication, dated Aug. 6, 2015, 1 page.
U.S. Appl. No. 14/614,292: Electronic Terminal Disclaimer Filed and Approved, Nov. 20, 2015, 3 pages.
U.S. Appl. No. 14/614,292: Non-Final Rejection, dated May 19, 2016, 10 pages.
U.S. Appl. No. 14/614,292: Amendment/Req. Reconsideration-After Non-Final Rejection, dated Aug. 18, 2016, 20 pages.
U.S. Appl. No. 14/614,292: Notice of Allowance and Fees, dated Sep. 21, 2016, 8 pages.
U.S. Appl. No. 14/614,292: Issue Fee Payment and Amendment after Notice of Allowance, dated Dec. 21, 2016, 4 pages.
U.S. Appl. No. 14/614,292: Issue Notification, dated Jan. 18, 2017, 1 page.
U.S. Appl. No. 11/412,417, filed Apr. 26, 2006, 96 pages.
U.S. Appl. No. 11/412,417: Notice of Missing Parts dated May 19, 2006, 2 pages.
U.S. Appl. No. 11/412,417: Response to Notice of Missing Parts dated Jul. 19, 2006, 14 pages.
U.S. Appl. No. 11/412,417: Non-final Office Action dated Apr. 1, 2008, 53 pages.
U.S. Appl. No. 11/412,417: Amendment dated Aug. 1, 2008, 34 pages.
U.S. Appl. No. 11/412,417: Final Office Action dated Nov. 13, 2008, 40 pages.
U.S. Appl. No. 11/412,417: RCE and Amendment dated May 12, 2009, 36 pages.
U.S. Appl. No. 11/412,417: Non-final Office Action dated Jun. 30, 2009, 141 pages.
U.S. Appl. No. 11/412,417: Examiner Interview Summary dated Oct. 30, 2009, 3 pages.
U.S. Appl. No. 11/412,417: Amendment dated Oct. 30, 2009, 33 pages.
U.S. Appl. No. 11/412,417: Final Office Action dated Jan. 4, 2010, 37 pages.
U.S. Appl. No. 11/412,417: RCE with Amendment dated May 4, 2010, 27 pages.
U.S. Appl. No. 11/412,417: Supplemental Office Action Response dated Jun. 22, 2010, 22 pages.
U.S. Appl. No. 11/412,417: Notice of Allowance and bibliographic data sheet dated Jul. 6, 2010, 9 pages.
U.S. Appl. No. 11/412,417: RCE dated Oct. 5, 2010, 4 pages.
U.S. Appl. No. 11/412,417: Notice of Allowance and bibliographic data sheet dated Oct. 26, 2010, 4 pages.
U.S. Appl. No. 11/412,417: Issue Fee Payment and Comments on Reasons for Allowance dated Jan. 26, 2011, 6 pages.
U.S. Appl. No. 11/412,417: Issue Notification dated Feb. 9, 2011, 1 page.
U.S. Appl. No. 13/030,084, filed Feb. 17, 2011, 103 pages.
U.S. Appl. No. 13/030,084: Filing receipt and Notice to File Missing parts dated Mar. 3, 2011, 6 pages.
U.S. Appl. No. 13/030,084: Response to Notice to File Missing Parts, dated Aug. 3, 2011, 23 pages.
U.S. Appl. No. 13/030,084: Updated filing receipt, dated Aug. 11, 2011, 3 pages.
U.S. Appl. No. 13/030,084: Non-Final Rejection dated Oct. 26, 2011, 34 pages.
U.S. Appl. No. 13/030,084: Notice of Publication dated Nov. 17, 2011, 1 page.
U.S. Appl. No. 13/030,084: Amendment, dated Jan. 26, 2012, 35 pages.
U.S. Appl. No. 13/030,084: Notice regarding non-compliant amendment, dated Jan. 31, 2012, 4 pages.
U.S. Appl. No. 13/030,084: Amendment, dated Feb. 9, 2012, 35 pages.
U.S. Appl. No. 13/030,084: Amendment after final, dated Jun. 14, 2012, 88 pages.
U.S. Appl. No. 13/030,084: Advisory Action, dated Jun. 26, 2012, 4 pages.
U.S. Appl. No. 13/030,084: RCE, dated Jul. 23, 2012, 89 pages.
U.S. Appl. No. 13/030,084: Notice regarding non-compliant amendment, dated Jul. 25, 2012, 2 pages.
U.S. Appl. No. 13/030,084: Amendment, dated Jan. 2, 2013, 40 pages.
U.S. Appl. No. 13/030,084: Refund request, dated Jan. 23, 2013 17 pages.
U.S. Appl. No. 13/030,084: Non-Final office action, dated Apr. 30, 2013, 39 pages.
U.S. Appl. No. 13/030,084: Response to non-final office action, dated Jul. 30, 2013, 28 pages.
U.S. Appl. No. 13/030,084: Non-final office action, dated Oct. 10, 2013, 44 pages.
U.S. Appl. No. 13/030,084: Response after Non-Final Reject, dated Jan. 2, 2014, 1 Page.
U.S. Appl. No. 13/030,084: Final Rejection, dated Mar. 19, 2014, 41 Pages.
U.S. Appl. No. 13/030,084: Amendment Submitted/Entered with Filing of CPA/RCE, dated May 19, 2014, 38 Pages.
U.S. Appl. No. 13/030,084: Advisory Action (PTOL-303), dated Jun. 6, 2014, 4 Pages.
U.S. Appl. No. 13/030,084: Applicant Initiated Interview Summary (PTOL-413), dated Jul. 1, 2014, 3 Pages.
U.S. Appl. No. 13/030,084: Request for Continued Examination, dated Aug. 15, 2014, 26 Pages.
U.S. Appl. No. 13/030,084: Non-Final Rejection and Examiner's Search, dated Mar. 24, 2015, 24 pages.
U.S. Appl. No. 13/030,084: Amendment/Req. Reconsideration After Non-Final Rejection, dated Jun. 24, 2015, 28 pages.
U.S. Appl. No. 13/030,084: Terminal Disclaimer filed and Approved, Sep. 10, 2015, 3 pages.
U.S. Appl. No. 13/030,084: Notice of Allowance and Fees, dated Sep. 17, 2015, 24 pages.
U.S. Appl. No. 13/030,084: Issue Fee Payment and Amendment, dated Dec. 10, 2015, 4 pages.
U.S. Appl. No. 14/968,429, filed Dec. 14, 2015.
U.S. Appl. No. 14/968,429: Filing Receipt, dated Jan. 4, 2016, 3 pages.
U.S. Appl. No. 14/968,429: Applicant Response to Pre-Exam Formalities Notice, Jan. 14, 2016, 35 pages.
U.S. Appl. No. 14/968,429: Filing Receipt, dated Jan. 21, 2016, 3 pages.
U.S. Appl. No. 14/968,429: Notice of Publication, dated Apr. 28, 2016, 1 page.
U.S. Appl. No. 14/968,429: Non-Final Rejection, dated May 15, 2017, 8 pages.
U.S. Appl. No. 14/968,429: Amendment/Req. Reconsideration-After Non-Final Reject, dated Aug. 9, 2017, 19 pages.
U.S. Appl. No. 14/968,429: Final Rejection, dated Oct. 24, 2017, 10 pages.

(56) References Cited

OTHER PUBLICATIONS

U.S. Appl. No. 11/480,094, filed Jun. 29, 2006, 125 pages.
U.S. Appl. No. 11/480,094: Notice to File Corrected Application Papers dated Aug. 2, 2006, 2 pages.
U.S. Appl. No. 11/480,094: Response to Notice to File Corrected Application Papers dated Nov. 2, 2006, 32 pages.
U.S. Appl. No. 11/480,094: Filing Receipt dated Dec. 7, 2006, 3 pages.
U.S. Appl. No. 11/480,094: Non-final Office Action dated Nov. 7, 2008, 28 pages.
U.S. Appl. No. 11/480,094: Amendment dated May 7, 2009, 37 pages.
U.S. Appl. No. 11/480,094: Final Office Action dated Jul. 28, 2009, 16 pages.
U.S. Appl. No. 11/480,094: RCE with Amendment dated Dec. 28, 2009, 39 pages.
U.S. Appl. No. 11/480,094: Office Action dated Dec. 15, 2010, 15 pages.
U.S. Appl. No. 11/480,094: Office Action response, dated May 16, 2011, 29 pages.
U.S. Appl. No. 11/480,094: Final Office Action, dated Aug. 1, 2011, 13 pages.
U.S. Appl. No. 11/480,094: Amendment after final dated Nov. 1, 2011, 32 pages.
U.S. Appl. No. 11/480,094: Advisory Action dated Nov. 14, 2011, 3 pages.
U.S. Appl. No. 11/480,094: Notice of Appeal dated Nov. 28, 2011, 1 page.
U.S. Appl. No. 11/480,094: Abandonment, dated Jul. 31, 2012, 2 pages.
U.S. Appl. No. 14/870,744: Amendment/Req. Reconsideration—After Non-Final Reject, dated Nov. 24, 2017, 30 pages.
U.S. Appl. No. 12/573,829: Non-Final Rejection, dated Dec. 27, 2017, 13 pages.
U.S. Appl. No. 15/250,118: Final Rejection, dated Dec. 15, 2017, 25 pages.
U.S. Appl. No. 15/214,168: Amendment after Notice of Allowance, dated Nov. 1, 2017, 22 pages.
U.S. Appl. No. 15/214,168: Issue Notification, dated Nov. 21, 2017, 1 page.
U.S. Appl. No. 15/802,348: Applicant Response to Pre-Exam Formalities Notice, dated Jan. 9, 2018, 17 pages.
U.S. Appl. No. 15/802,348: Filing Receipt, dated Jan. 11, 2018, 4 pages.
U.S. Appl. No. 12/830,236: Non-Final Rejection, dated Feb. 6, 2018, 28 pages.
U.S. Appl. No. 14/641,735: Amendment/Req. Reconsideration-After Non-Final Reject, dated Nov. 24, 2017, 28 pages.
U.S. Appl. No. 15/240,964: RCE and Amendments, dated Nov. 9, 2017, 31 pages.
U.S. Appl. No. 14/596,154: Amendment/Req. Reconsideration-After Non-Final Reject, dated Dec. 21, 2017, 37 pages.
U.S. Appl. No. 14/968,429: Response After Final Action, dated Dec. 26, 2017, 28 pages.
U.S. Appl. No. 14/968,429: Advisory Action, dated Jan. 11, 2018, 5 pages.
Boppana et al., "Full Fault Dictionary Storage Based on Labeled Tree Encoding", Proceedings of 14$^{th}$ VLSI Test Symposium, 1996, pp. 174-179.
U.S. Appl. No. 14/870,744: Final Rejection, dated Mar. 30, 2018, 20 pages.
U.S. Appl. No. 12/573,829: Amendment/Req. Reconsideration-After Non-Final Reject, dated Mar. 27, 2018, 22 pages.
U.S. Appl. No. 15/250,118: RCE and Amendments, dated Apr. 16, 2018, 44 pages.
U.S. Appl. No. 15/802,348: Notice of Publication, dated Apr. 19, 2018, 1 page.
U.S. Appl. No. 12/830,236: Amendment/Req. Reconsideration-After Non-Final Reject, dated May 4, 2018, 26 pages.
U.S. Appl. No. 14/641,735: Final Rejection, dated Mar. 15, 2018, 25 pages.
U.S. Appl. No. 14/641,735: Response After Final Action, dated May 15, 2018, 28 pages.
U.S. Appl. No. 14/596,154: Notice of Allowance and Fees Due, dated May 2, 2018, 8 pages.
U.S. Appl. No. 14/968,429: Terminal Disclaimer-Filed and Approved, dated Feb. 7, 2018, 3 pages.
U.S. Appl. No. 14/968,429: Response After Final Action, dated Feb. 7, 2018, 13 pages.
U.S. Appl. No. 14/968,429: Notice of Allowance and Fees Due, dated Feb. 26, 2018, 8 pages.
U.S. Appl. No. 14/968,429: Notice of Allowance and Fees Due, dated Mar. 19, 2018, 6 pages.
U.S. Appl. No. 14/870,744: RCE and Amendments, dated Jul. 27, 2018, 33 pages.
U.S. Appl. No. 14/870,744: Notice of Allowance and Fees Due, dated Sep. 6, 2018, 11 pages.
U.S. Appl. No. 12/573,829: After Final Consideration Program Request, Sep. 7, 2018, 23 pages.
U.S. Appl. No. 12/830,236: Final Rejection, dated Sep. 5, 2018, 30 pages.
U.S. Appl. No. 14/641,735: RCE and Amendments, dated Jul. 16, 2018, 34 pages.
U.S. Appl. No. 15/240,964: Non-Final Rejection, dated Jul. 30, 2018, 32 pages.
U.S. Appl. No. 14/596,154: Issue Notification, dated Aug. 21, 2018, 1 page.
U.S. Appl. No. 16/048,119, filed Jul. 27, 2018, 81 pages.
U.S. Appl. No. 16/048,119: Filing Receipt, Aug. 24, 2018, 3 pages.
U.S. Appl. No. 16/048,119: Notice to File Missing Parts, Aug. 24, 2018, 2 pages.
14/968,429: Response to Amendment under Rule 312, dated Jul. 23, 2018, 2 pages.
14/968,429: Issue Notification, dated Aug. 1, 2018, 1 page.
16/048,061, filed Jul. 27, 2018, 101 pages.
U.S. Appl. No. 16/048,061: Notice to File Missing Parts, Aug. 13, 2018, 2 pages.
U.S. Appl. No. 16/048,061: Filing Receipt, Aug. 13, 2018, 4 pages.
U.S. Appl. No. 14/870,744: Advisory Action, dated Jul. 3, 2018, 5 pages.
U.S. Appl. No. 12/573,829: Final Rejection, dated Jul. 11, 2018, 15 pages.
U.S. Appl. No. 14/641,735: Advisory Action, dated Jun. 8, 2018, 4 pages.
U.S. Appl. No. 14/641,735: Internet Communications Authorized, Jun. 23, 2018, 2 pages.
U.S. Appl. No. 14/968,429: Response to Amendment under Rule 312, dated Jul. 10, 2018, 2 pages.

* cited by examiner

Q(0) ⇒ 2
Q(1) ⇒ 3
Q(2) ⇒ 5
Q(3) ⇒ 7
Q(4) ⇒ 11
Q(5) ⇒ 13
Q(6) ⇒ 17
Q(7) ⇒ 19
Q(8) ⇒ 23
Q(9) ⇒ 29
Q(10) ⇒ 31
Q(11) ⇒ 37
Q(12) ⇒ 41

(((A(1) * B((((A(D(1) * B(C(1)))) * A(A(1)) * D(1)))) *A(1)) *C(D(1)))

| View 1 Trees | Symbol Strings | Numerals |
|---|---|---|
| | <λ> | 0 |
| | <( )> | 1 |
| | <( ) ( )> | 2 |
| | <(( )) > | 3 |
| | <( ) ( ) ( )> | 4 |
| | <(( ) ( ))> | 5 |
| | <( ) (( ))> | 6 |
| | <((( )))> | 7 |
| | <( )( ) ( )( )> | 8 |
| | <(( )) (( ))> | 9 |
| | <( )(( )( ))> | 10 |

Fig. 7

| View 1 Trees | Symbol Strings | Numerals |
|---|---|---|
| | <λ> | 0 |
| | <{ }> | 1 |
| | <{ }{ }> | 2 |
| | <{{ }}> | 3 |
| | <{ }{ }{ }> | 4 |
| | <{{ }{ }}> | 5 |
| | <{ }{{ }}> | 6 |
| | <{{{ }}}> | 7 |
| | <{ }{ }{ }{ }> | 8 |
| | <{{ }}{{ }}> | 9 |
| | <{ }{{ }{ }}> | 10 |

Fig. 8

| View 1 Trees | Symbol Strings | Numerals |
|---|---|---|
| • | <λ> | 0 |
| (2-node path) | <[ ]> | 1 |
| (root with 2 children) | <[ ][ ]> | 2 |
| (3-node path) | <[[ ]]> | 3 |
| (root with 3 children) | <[ ][ ][ ]> | 4 |
| | <[[ ][ ]]> | 5 |
| | <[ ][[ ]]> | 6 |
| | <[[[ ]]]> | 7 |
| | <[ ][ ][ ][ ]> | 8 |
| | <[[ ]][[ ]]> | 9 |
| | <[ ][[ ][ ]]> | 10 |

Fig. 9

| View 2 Trees | Symbol Strings | Numerals |
|---|---|---|
| • | <λ> | 0 |
| •—• | <( )> | 1 |
| tree | <( )( )> | 2 |
| tree | <{ }> | 3 |
| tree | <( )( )( )> | 4 |
| tree | <(( ))> | 5 |
| tree | <( ){ }> | 6 |
| tree | <{( )}> | 7 |
| tree | <( )( )( )( )> | 8 |
| tree | <{ }{ }> | 9 |
| tree | <( )(( ))> | 10 |

Fig. 10

| View 1 Trees | Symbol Strings | Numerals |
|---|---|---|
| • | <λ> | 0 |
| •—A—• | <( )> | 1 |
| A •—• A | <( ) ( )> | 2 |
| •—B—• | <{ }> | 3 |
| A •—A—• A | <( ) ( ) ( )> | 4 |
| C •—• | <[ ]> | 5 |
| A •—• B | <( ) { }> | 6 |
| A •—A—• | <(( ))> | 7 |
| A •—A—A—• A | <( )( ) ( )( )> | 8 |
| B •—• B | <{ }{ }> | 9 |
| A •—• C | <( )[ ]> | 10 |
| A •—B—• | <{( )}> | 11 |
| A •—A—• B | <( )( ){ }> | 12 |
| C •—A—• | <[( )]> | 13 |

Fig. 11

METHOD AND/OR SYSTEM FOR TRANSFORMING BETWEEN TREES AND STRINGS

RELATED APPLICATION

This application claims priority to U.S. Provisional Patent Application Ser. No. 60/657,264 filed Feb. 28, 2005, entitled METHOD AND/OR SYSTEM FOR TRANSFORMING BETWEEN TREES AND STRINGS, assigned to the assignee of claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIGS. 7 through 9 are tables illustrating embodiments of a relationship among symbol strings, trees and natural numerals;

FIG. 10 is a table illustrating an embodiment of a relationship among natural numerals, BELTs and symbol strings comprising two types of grouping symbol pairs;

FIG. 11 is a table illustrating an embodiment of a relationship between natural numerals, tertiary A, B, C, edge labeled trees and symbol strings comprising three types of grouping symbol pairs;

DETAILED DESCRIPTION

Figure 1:
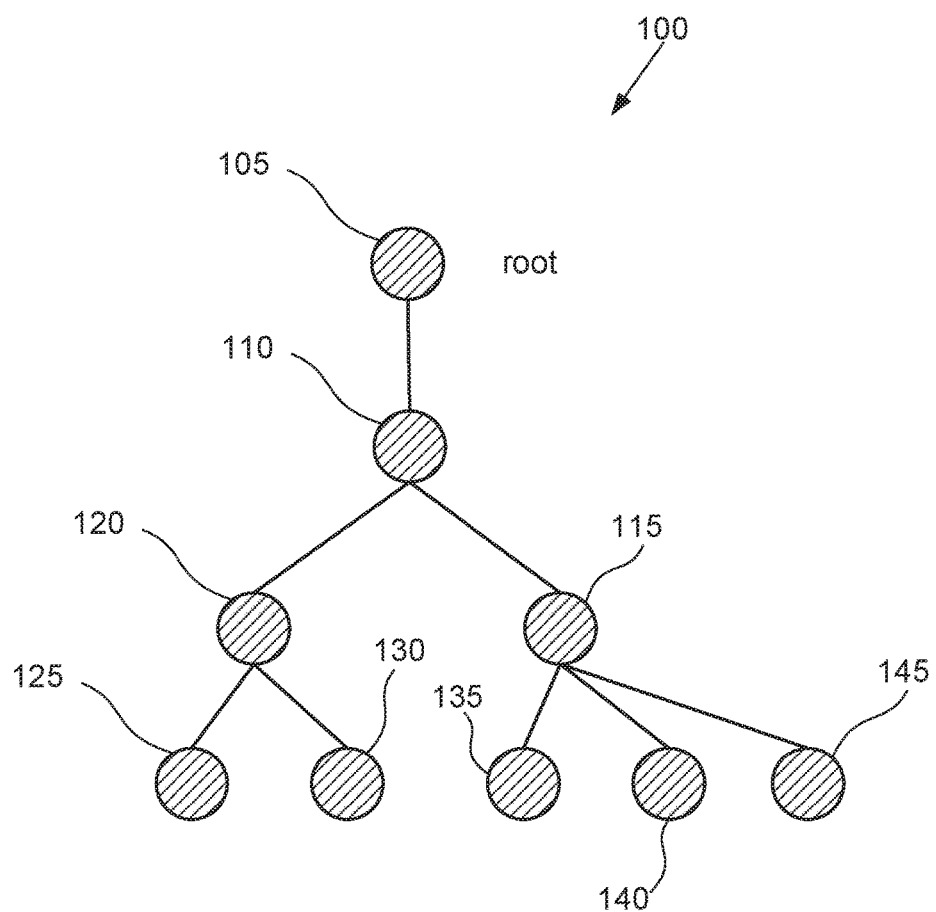
FIG. 1 is a schematic diagram of an unordered tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "transforming," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, non-empty (including at least one node), rooted, connected, acyclic graph. Likewise, such trees may be either ordered or unordered. Further discussion of non-empty trees may be found in *The Art of Computer Programming, Vol. 1, Fundamental Algorithms*, Donald Knuth, Addison Wesley. Here, ordered refers to the notion that there is an ordering or precedence among nodes attached to a common node corresponding to the order of the attached nodes shown in a graphical illustration. An unordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete non-backtracking loop.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values represented as "edge label values." Similarly, in another particular embodiment, a tree may include nodes that are labeled with data and/or values represented as "node label values." Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with three values, such as 0, 1, 2. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with the numerals previously described. Any distinctly identifiable labels may be employed; however, in this context, it shall be understood that employing numerals to label the edges is sufficiently general to encompass any sort of data labels that may be desirable, regardless of their form.

To reiterate, in this context, a tree comprises an edge labeled tree if each edge of the tree respectively holds, stores and/or represents a value or piece of data. Likewise, in this context, two nodes are employed to support an edge storing, holding and/or representing a piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

According to an embodiment, trees or portions of trees may be represented by natural numerals according to an association of trees and natural numerals. Without belaboring the present discussion, additional descriptions of how natural numerals may be associated with trees are discussed in greater detail below and in U.S. patent application Ser. No. 11/005,859, filed on Dec. 6, 2004, by J. J. LeTourneau, titled, "Manipulating Sets of Hierarchical Data," assigned to the assignee of the presently claimed subject matter. It should be understood, however, that while the particular embodiments illustrated are directed to particular associations of numerals and trees, there may be many associations of trees to numerals according to corresponding particular "association embodiments," and the claimed subject matter is not limited to any such particular association.

According to an embodiment, although the claimed subject matter is not limited in scope in this respect, a method of enumerating a set of unordered trees may begin with enumeration of a one node binary edge labeled tree. The one node tree, which holds no data, is associated with the natural numeral one and has a graphical representation of a single node in this embodiment. For higher natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985.

As illustrated, for this particular embodiment, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one. It should be understood that, while this particular embodiment associates a single node tree with the numeral one, and associates other trees with other numerals based, at least in part, upon this association, other embodiments illustrated below associate a single node tree with the numeral zero, or different numerals. Other trees in this association embodiment may then be based, at least in part, on this association.

Continuing with this example, to obtain the binary edge labeled tree for position four, observe that numeral four is the product of numeral two times numeral two. Thus, a union is formed at the root of two trees, where, here, each of those trees is associated with the natural numeral two. Likewise, to obtain the binary edge labeled tree for position five, begin with the binary edge labeled tree for position two and follow the previously articulated approach of adding a root and an edge and labeling it with a binary zero.

Figures 3, 4:
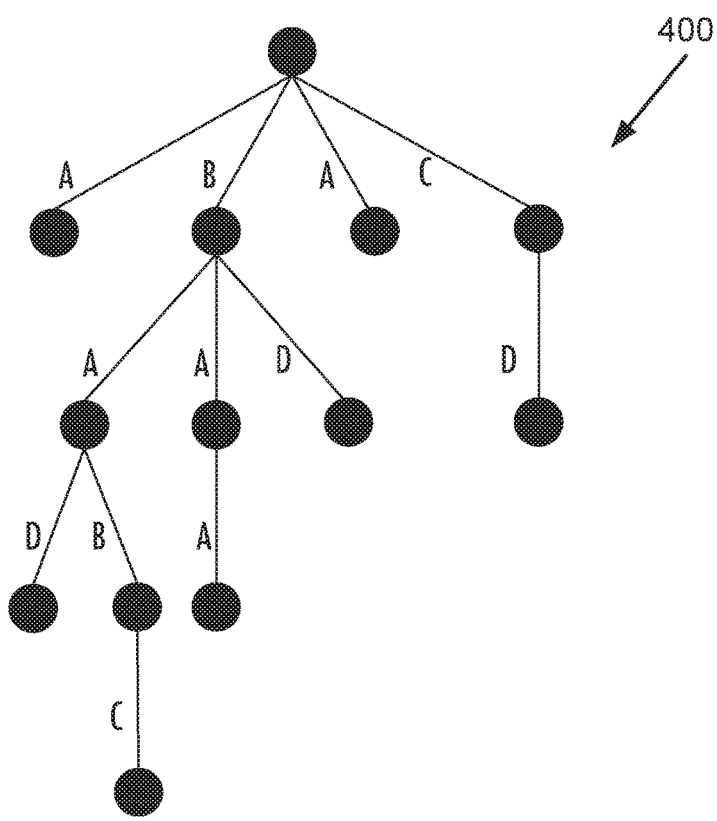
FIG. 3 is a table providing an embodiment of a function that relates natural numerals to non-composite numerals.
FIG. 4 is a schematic diagram illustrating an embodiment of an unordered edge-labeled tree and a symbolic expression mathematically representing the tree embodiment.

In this context, adding a root node and an edge to a BELT and labeling it binary zero is referred to as a "zero-push" operation and adding a root node and an edge to the BELT and labeling it binary one is referred to as a "one-push" operation. Here, a numeral associated with a tree resulting from either a zero-push or a one-push operation, according to a particular association embodiment, may be represented as a numerical operation on the numeral representing the BELT as follows:

$$\text{zero-Push}(x) = Q(2x-2)$$

$$\text{one-Push}(x) = Q(2x-1)$$

where:
x=numeral associated with BELT according to the particular association embodiment; and
Q(k) is a function generating an ordered sequence of non-composite numerals as shown in FIG. 3.

Figure 2:
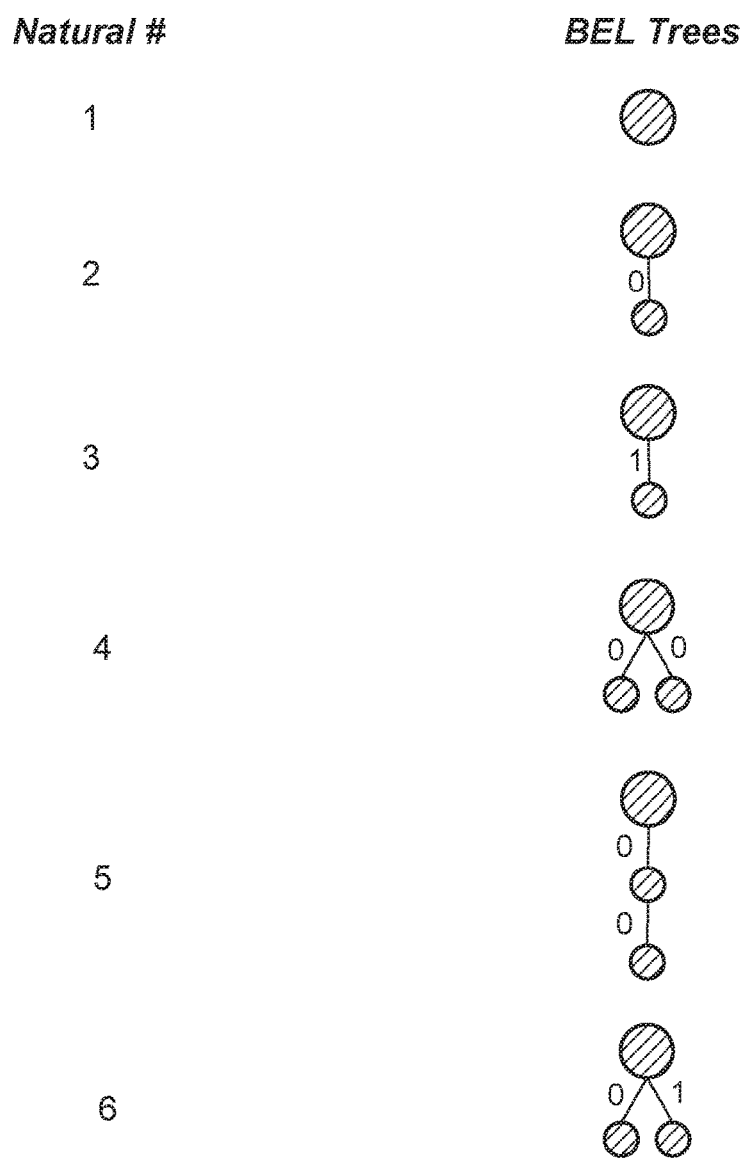
FIG. 2 is a table illustrating an embodiment of a relationship between binary edge labeled trees (BELTs) and positive natural numerals.

Thus, referring again to FIG. 2, the one-push of the root tree is the tree at position three. This follows since $Q((1*2)-1)=Q(1)=3$. Likewise, the tree at position five is the zero-push of the tree at position 2. This follows since $Q((2*2)-2)=Q(2)=5$.

In the presently illustrated embodiment, the function $Q(k)$ relates to the well known Kleene enumeration function for the sequential enumeration of non-composite numerals $P(k)$. Accordingly, in this context, the term prime numerals and non-composite numerals may be used interchangeably throughout. Here, the function $Q(k)$ may be generated as $Q(k)=P(k+1)$ where the Kleene enumeration function is expressed, in part, as follows:

$P(1)=2$ $P(2)=3$ $P(3)=5$ $P(4)=7$

. . .

In the embodiment just described, binary edge labeled trees use binary numerals "0" and "1." However, the claimed subject matter is not limited in scope to binary edge labeled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree.

The foregoing discussion has begun to characterize an algebra involving trees, in this particular embodiment, an algebra for unordered edge labeled trees or unordered ELTs, such as BELTs. The foregoing discussion define a value one, a one node tree for this particular embodiment, and a monadic operation, previously described as zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality. For this particular embodiment, an additional operation may be characterized, a "merger" operation. The merger operation with respect to trees refers to merging two trees at their roots.

As will now be appreciated, the merger operation comprises a dyadic operator or, in this context, also known as a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation that returns "c" and is denoted as "c." The merger operator is denoted as "*".

FIG. 4 is schematic diagram illustrating an embodiment of an edge labeled tree, here a four valued edge labeled tree. In this particular embodiment, four distinct values are employed to label the edges. Here, the labels comprising A, B, C and D, although, of course, the claimed subject matter is not limited to four valued edge labeled trees, to edge labeled trees, or to employing these particular edge labels. It is noted that the labels A, B, C, and D in this embodiment are similar to the labels binary 0 and binary 1 for BELTs. Below tree 400 in FIG. 4 is a symbolic expression mathematically representing tree 400. Performing the operations indicated by the expression shown in FIG. 4 below tree 400 will provide a natural numeral that corresponds, for this particular embodiment, to this particular tree, as described in more detail hereinafter.

Figure 5:
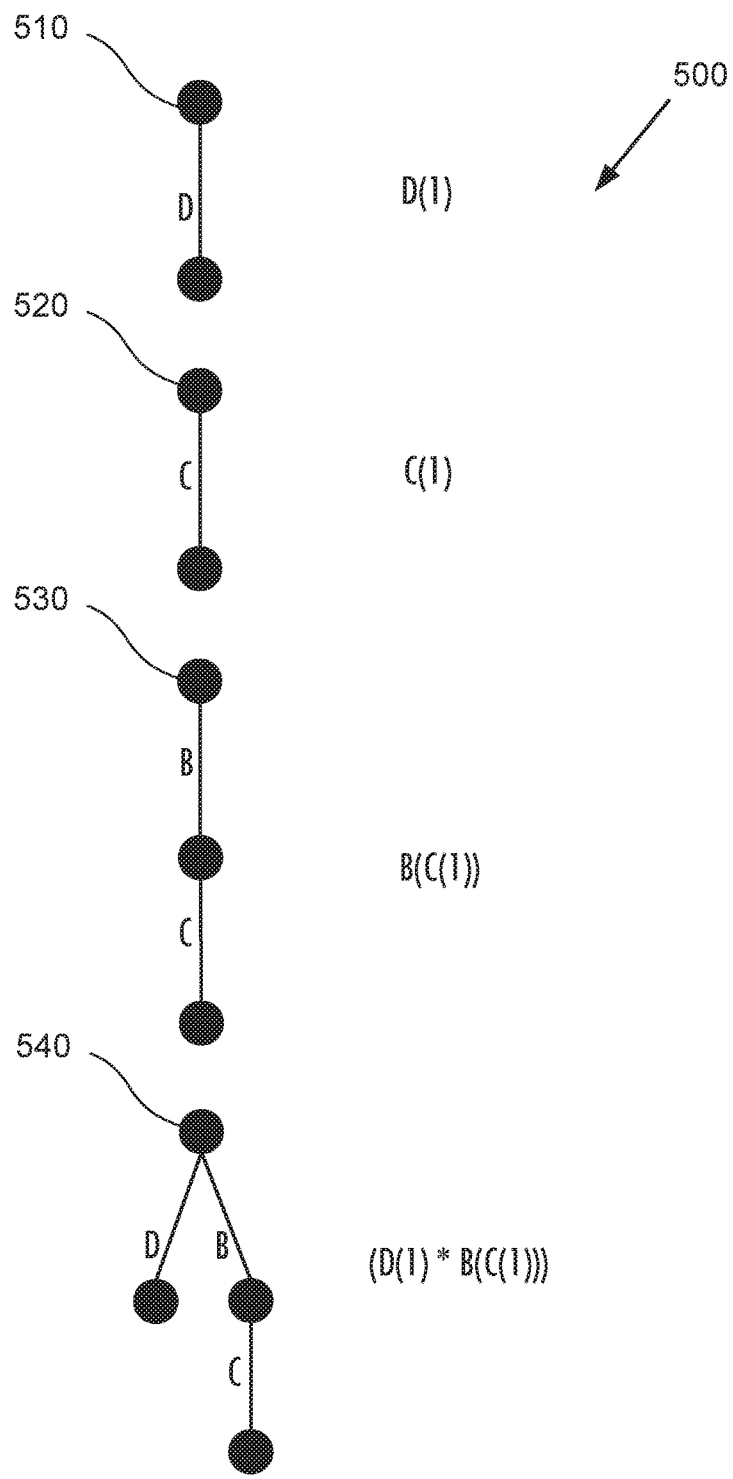
FIG. 5 is a schematic diagram of embodiments of unordered edge-labeled trees and symbolic expressions mathematically representing the tree embodiments.

To assist in understanding the relationship between the symbolic expression shown in FIG. 4 and tree 400, for this particular embodiment, FIG. 5 provides an embodiment 510 of another tree. As illustrated, tree 510 comprises an edge label D connecting two nodes. For this particular context, this embodiment may be expressed symbolically as follows: D(1). Thus, a technique to describe the embodiment of tree 510 would refer to the "push" of the natural numeral 1. Here, for this particular embodiment, this particular push operation comprises the "D" push of 1, resulting in D being the label of the edge connecting the two nodes. More specifically, as previously described, a single node is associated with the natural numeral 1 in this particular embodiment. To perform a push operation, an edge is attached to that node and labeled. Here, applying a D push, the label provided comprises the label D.

Continuing, the "C" push of "1" is illustrated as two nodes with an edge labeled C connecting the two nodes for tree embodiment 520. Applying similar reasoning provides an edge labeled tree embodiment 530 representing the following expression: B(C(1)). Likewise, for this particular embodiment, the operation of merger may be represented as "*", as previously suggested. Thus, applying a merger operation provides tree embodiment 540 at the bottom of FIG. 5 corresponding, for this particular embodiment, to the following expression:

$$(D(1)*B(C(1))).$$

Figure 6:
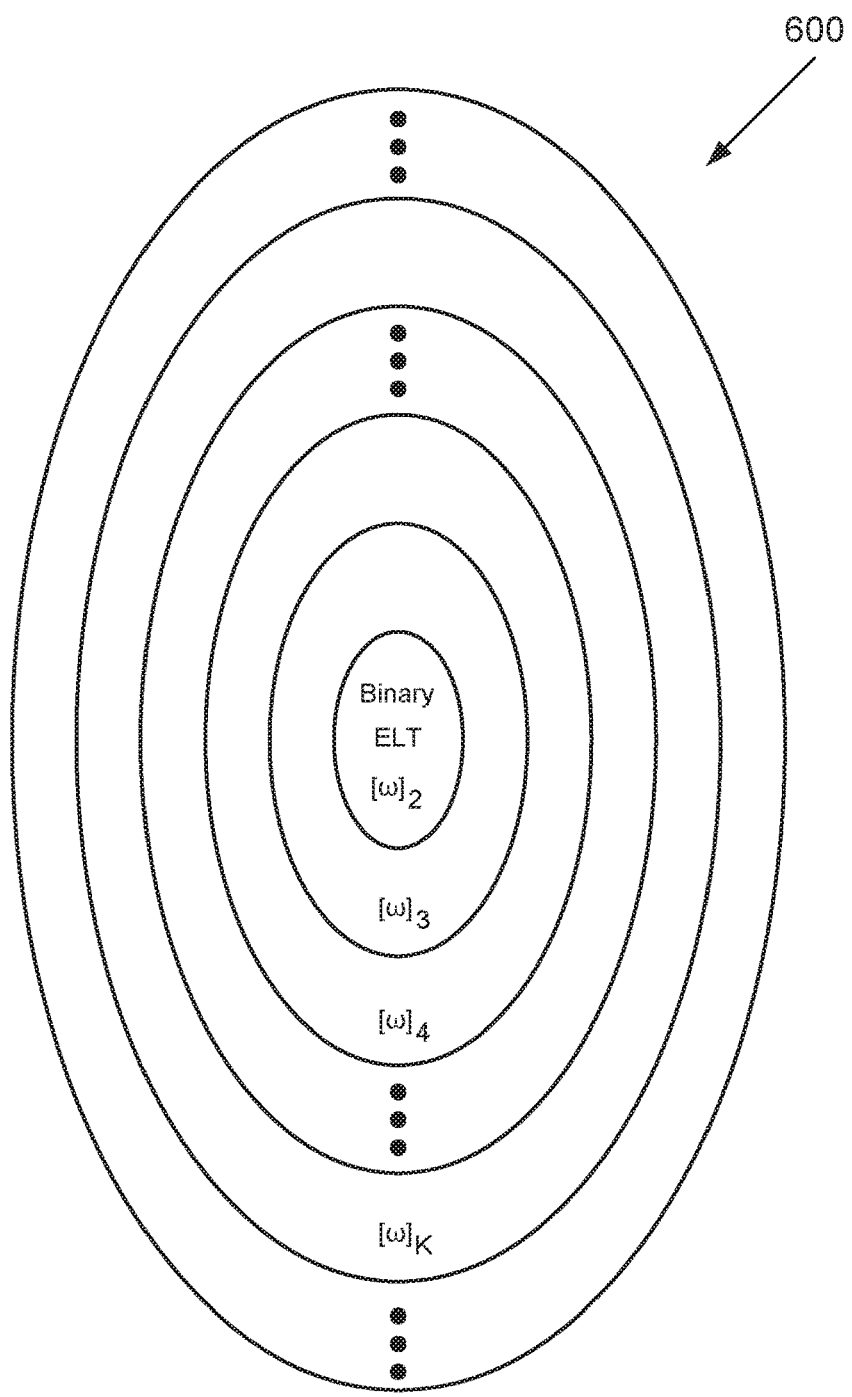
FIG. 6 is a schematic diagram illustrating all N-valued rooted, unordered, edge-labeled trees, where N is a natural numeral greater than or equal to two.

Previously, an embodiment for manipulating binary edge labeled trees or BELTs was described in connection with the aforementioned U.S. patent application Ser. No. 11/005,859. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Referring now to FIG. 6, a Venn diagram 600 is illustrated providing the set of all edge labeled trees, structured or organized in a particular manner here. In the center of the diagram, binary or two valued edge labeled trees are depicted as a subset. Furthermore, as illustrated, two valued edge labeled trees are also depicted as a subclass or subset of tertiary or three valued edge labeled trees. Likewise, three valued edge labeled trees are depicted as a subclass or subset of four valued edge labeled trees and so forth. Thus, depending at least in part on the particular set of distinct values employed to label the edges, an edge labeled tree that employs two distinct values may comprise an example of a three valued edge labeled tree in which one of the values is specifically not employed in the particular tree. As shall be explained in more detail hereinafter, this raises a question regarding proper interpretation of the data that the tree may hold, represent and/or store. More specifically, an identical tree may represent different data depending at least in part on whether the tree is "viewed" as, to continue with this example, a two valued edge labeled tree or a three valued edge labeled tree. For example, up to two views of a two valued tree may be obtained and up to three views of a three valued tree may be obtained.

Thus, in this embodiment, we refer to this as the "view" of the particular expression. While particular embodiments illustrated herein relate to obtaining views of particular expressions known as trees, other embodiments may relate to obtaining views of other types of expressions such as symbol strings as illustrated below. However, symbol strings and trees are merely examples of expressions from which a view may be obtained and claimed subject matter is not limited in this respect. For a particular example of expressions comprising trees, for the purposes of illustration, a two valued edge labeled tree is referred to as view 2 and a three valued edge labeled tree is referred to as view 3, although, for example, the particular tree may not contain three different values. The view in this embodiment is determined, at least in part, by the set of distinct values from which the labels may be selected, as previously described. FIG. 6 therefore depicts the set of all edge labeled trees as the union of all such edge labeled trees in which the edge values are selected from a set having a specific number of distinct values.

Previously in the aforementioned U.S. patent application Ser. No. 11/005,859, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, according to particular association embodiments, for example, three valued edge label trees may be expressed as numerals, four valued edge labeled trees may be expressed as numerals and so forth. Thus, manipulations, such as those previously described, for example, in aforementioned U.S. patent application Ser. No. 11/005,859, as well as additional manipulations, may be applied to N valued edge labeled trees, as described in U.S. patent application Ser. No. 11/006,446, filed on Dec. 6, 2004 by J. J, LeTourneau, titled "Method and/or System for Tagging Trees," and assigned to the assignee of the presently claimed subject matter. However, these are merely examples of how edge labeled trees may be manipulated and the claimed subject matter is not limited in this respect.

According to an embodiment, a "set" may define a collection of unique unordered elements or members. For example, for the purpose of illustration, a set may contain members or elements of a distinct classification, such as the set of all automobiles in a parking lot of a particular color. In a particular embodiment illustrated in FIG. 6, for example, trees may be classified into sets defined by certain characteristics, such as the particular view expressed, and the like. However, this is merely an example of how trees may be classified into distinct sets and the claimed subject matter is not limited in this respect. As illustrated below, symbol strings may similarly be classified based, at least in part, on the particular view that may be expressed in such symbol strings.

According to an embodiment, a "transformation" may define a process by which elements of a first set may be mapped between and/or associated with elements of a second set. For example, in a particular embodiment, a transformation may map and/or associate a member of the set of trees with a member of the set of symbol strings. Similarly, according to a particular embodiment, a transformation may map and/or associate a member of the set of natural numerals to a member in either the set of trees or the set of symbol strings. However, these are merely examples of how a transformation may map and/or associate members of one set to members of another set, and the claimed subject matter is not limited in these respects.

According to an embodiment, a transformation may associate and/or map an element in a first set with an element in a second set as an "elementary equivalent." Here, in a particular embodiment, such a transformation may associate such elementary equivalent elements in different sets in a one-to-one and onto mapping in which the transformation defines for elements in a first set corresponding, unique elementary equivalents in a second set. Similarly, a transformation may also map and/or associate members of the second set to or between corresponding elementary equivalents in the first set. Examples of a transformations mapping and/or associating elementary equivalent elements of different sets may be found in, for example, *Logical Number Theory, An Introduction*, by Craig Smorynski, p. 305. However, this is merely an example of how a transformation may map and/or associate members of different sets as elementary equivalents, and the claimed subject matter is not limited in these respects.

FIGS. 7 through 11 are tables illustrating strings of grouping symbols according to an embodiment. As discussed in the aforementioned U.S. patent application Ser. No. 11/005,859, strings may be associated with numerals according to particular association embodiments. Grouping symbols may comprise symbols in a string of symbols that define relationships or groupings among symbols in the string. Particular embodiments relate to pairs of such grouping symbols. However, grouping symbols are not limited to grouping symbols in such grouping symbol pairs, and that grouping symbols may comprise grouping symbol triplets, quadruplets, etc.

As illustrated in FIGS. 7 through 11, in this particular embodiment, such strings may be formed from grouping symbol pairs to obey rules of parenthetical association. For example, in this particular case, including an "open symbol" (e.g., "(," "[" or "{", in particular embodiments) for every corresponding "close symbol" (e.g., ")," "]" or "}") and including a close symbol for every corresponding open symbol. The symbol strings may also be formed with symbol character pairs indicating a "close" or "end" for a particular string and/or portion of a string (e.g., in a particular embodiment, "{ ( [ ( ) ] ) } ( )" and not "{ ( [ ( ] ) ) }"). As in one example, if a first open symbol of a first type of grouping symbol pair is followed by a second open symbol of a second type of grouping symbol pair, a close symbol corresponding to the first open symbol may follow a close symbol corresponding to the second open symbol for proper parenthetical association. Symbol strings comprising grouping symbol pairs obeying these rules of parenthetical association are referred to herein as "well formed" symbol strings. However, these are merely examples of how strings may be formed from character symbols and the claimed subject matter is not limited in these respects.

The embodiments of FIGS. 7 through 11 show grouping symbols which are selected from characters set forth by the American Standard Code for Information Interchange (ASCII). However, these are mere examples of grouping symbols that may be used to represent information in a symbol string and the claimed subject matter is not limited in these respects.

Additionally, as with trees, as described above, such strings of grouping symbols may also define monadic and dyadic operations. For example, combining symbol strings end-to-end may define a dyadic "concatenation" operation in which a numeral representing the resulting combined string, according to an association embodiment, may comprise the product of numerals representing respective combined symbol strings. Also, encapsulating a symbol string with corresponding open and close symbols of a grouping symbol pair may define a monadic "encapsulation" operation. Here, in a particular embodiment as illustrated in FIGS. 7 through 11, an encapsulation of a symbol string "xxxxxx" may be represented as "(xxxxxx)", "[xxxxxx]" and/or "{xxxxxx}". However, these are merely examples of operations which may be used to manipulate a symbol string and the claimed subject matter is not limited to the use of these particular operations.

FIGS. 7 through 11 illustrate corresponding association embodiments associating symbol strings with corresponding numerals zero through ten. The symbol "λ" is used to represent the empty symbol string comprising no symbols, but is associated with a single node tree in this particular embodiment. It should be observed that in these particular association embodiments, the single node tree is associated with the numeral zero. However, as illustrated above, other association embodiments may associate a single node tree with numeral one. Particular association embodiments may define associations of one or more non-composite numerals of an initial sequence of non-composite numerals with a symbol string comprising one or more grouping symbol pairs. For example, numeral one is associated with "( )" in association embodiments 700, 1000 and 1100. Numeral one is associated with "{ }" in association embodiment 800 and "[ ]" in association embodiment 900. Numeral two is associated with "( ) ( )" in association embodiments 700, 1000 and 1100. Numeral two is associated with "{ } { }" in association embodiment 800 and "[ ] [ ]" in association embodiment 900. Numeral three is associated with "{ }" in embodiments 1000 and 1100. Numeral five is associated with "[ ]" in embodiment 1100. It should be understood, however, that these are merely examples of symbols that may represent initial non-composite numerals according to association embodiments and that other embodiments within the scope of the claimed subject matter may employ different symbols. As illustrated below, character strings representing remaining natural numerals of an association embodiment may be generated using the aforementioned concatenation and encapsulation operations.

As pointed out above, according to a particular embodiment, in general a concatenation of symbol strings for a concatenation operation results in a symbol string associated with a numeral that is a product of numerals representing respective concatenated symbol strings. However, an exception is that in the particular embodiments illustrated in FIGS. 7 through 11, multiplication of a numeral associated with a symbol string by a factor of two may be represented by the concatenation of a single pair of open and close symbols (e.g., "( )" for embodiments 700, 1000 and 1100, "{ }" for embodiment 800 and "[ ]" for embodiment 900) which in this embodiment represents a tree associated with numeral one. Thus, in these particular association embodiments, multiplication by a power of two, $2^n$, may be expressed as a concatenation of a symbol string comprising a sequence of n such grouping symbol pairs. However, this is merely an example of how a multiplication of numerals by a power of two may be represented as a concatenation of symbol strings and the claimed subject matter is not limited in these respects.

According to embodiment 700 of FIG. 7, an encapsulation operation may comprise providing a symbol string "(xxxxxx)" that is associated with the numeral Q(n) where n is the numeral associated with the symbol string "xxxxxx" according to this particular association embodiment. Accordingly, the symbol string associated with numeral three comprises "(( ))", an encapsulation of the symbol representing the numeral one "( )." The character string representing the numeral six may then be generated by concatenating the symbol strings "( )" (representing multiplication by a factor of two) and "(( ))", and the symbol string representing the numeral nine may be generated by concatenating the symbol strings "(( ))" and "(( ))." An encapsulation of the symbol string associated with numeral two "( ) ( )" generates a symbol string "(( ) ( ))" associated with the numeral five. Concatenating the symbol string "( )" then provides a symbol string "( ) (( ) ( ))" associated with the numeral ten. An encapsulation of the symbol string associated with numeral three "(( ))" generates a symbol string "((( )))" associated with the numeral seven. As should be observed, other than the symbol representing numerals one and two, symbol strings associated with non-composite natural numerals may be generated using the encapsulation operation. It should be evident by using the encapsulation and concatenation operations, symbol strings associated with remaining natural numerals may be generated in like fashion. However, these are merely examples of how the aforementioned concatenation and encapsulation operations may be used for generating symbol strings representing numerals and claimed subject matter is not limited in this respect.

It should be evident from the association of symbol strings and numerals illustrated above in embodiment 700 that symbol strings comprising different types of grouping symbols associated with numerals may similarly be generated for embodiments 800 and 900. Here, for example, multiplication of a numeral associated with a symbol string may be represented by concatenating grouping symbol pairs "{ }" or "[ ]" in embodiments 800 and 900, respectively. Also, by defining the symbol strings representing the numeral one ("{ }" in embodiment 800 and "[ ]" in embodiment 900) and two ("{ } { }" in embodiment 800 and "[ ] [ ]" in embodiment 900), symbol strings representing remaining non-composite numerals may be generated using encapsulation operations. Accordingly, concatenation and encapsulation operations in respective embodiments 700, 800 and 900 may be used to generate symbol strings associated with remaining natural numerals. Again, however, these are merely examples of how the aforementioned concatenation and encapsulation operations may be used for generating symbol strings representing numerals and claimed subject matter is not limited in this respect.

The particular embodiments illustrated with reference to FIGS. 7 through 9 are capable of expressing single views of a tree (e.g., trees having unlabeled nodes and/or edges or "unary" trees). Here, for example, symbol strings may comprise a single type of grouping symbol pair to express a single view while multiple types of grouping symbols may enable the expression of multiple views. In this embodiment, operations applied to symbol strings may express a push operation applied to trees and/or merger of trees at a root node, the former by encapsulating the symbol string and the later by concatenating symbol strings associated with the merged trees. Accordingly, the individual embodiments of FIGS. 7 through 9 may be capable of expressing unary trees as a symbol string comprising a single type of grouping symbol pairs. Again, as shall be made clear, the use of multiple types of grouping symbols may enable the expression of multiple views. As illustrated below with reference to FIGS. 10 and 11, for example, the use of two types of grouping symbol pairs (e.g., in one particular embodiment, "( )" and "{ }") in a symbol string enables the expression of both views of a binary tree and the use of three types of grouping symbols (e.g., in another particular embodiment, "( )," "{ }" and "[ ]") in a symbol string enables the expression of all three views of a tertiary tree. Accordingly, by having N types of grouping symbol, a symbol string may express a single view and up to an N number of views.

FIG. 10 is a table illustrating an association of numerals symbol strings comprising grouping symbol pairs "( )," and "{ }" which enables the expression of up to two views. Here, the aforementioned concatenation operation of embodiment 700 also applies in this particular association embodiment. That is, by this convention, multiplication of a numeral associated with a symbol string by a factor of two is represented by a concatenation of the symbol string "( )." Multiplication of numerals associated with other symbol strings may be represented by a concatenation of the symbol strings.

To generate symbol strings associated with non-composite numerals, embodiment 1000 defines two encapsulation operations corresponding with the grouping symbol pairs "( )" and "{ }." In this particular association embodiment, as pointed out above, symbol strings associated with the first three non-composite numerals, one, two and three, comprise "( )," "( )( )" and "{ }," respectively. Again, these are merely examples of symbol strings that may be selected as being associated with numerals one, two and three according to a particular association embodiment, and the claimed subject matter is not limited in these respects. As illustrated in FIG. 10, the symbol string associated with numeral three comprises "{ }," the symbol string associate with the next non-composite numeral, five, comprises "(( ))" and the symbol string associated with the next non-composite numeral, seven, comprises "{( )}." Accordingly, for this particular embodiment, an encapsulation operation on a symbol string associated with a numeral n provides a symbol string associated with a numeral may be defined as follows:

Q(2n)=numeral associated with an encapsulation by "( )" of a symbol string associated with numeral n (where n is a natural numeral greater than 0); and Q(2n+1)=numeral associated with an encapsulation by "{ }" of a symbol string associated with numeral n (where n is a natural numeral greater than or equal to 0).

Figure 12:
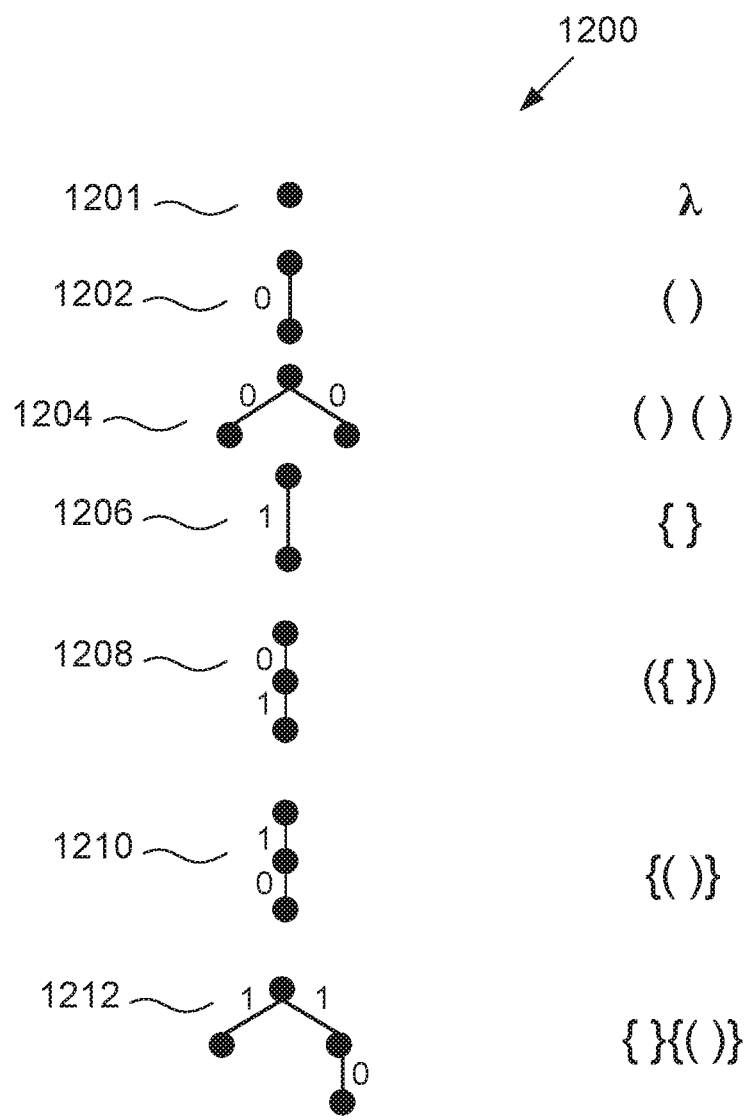
FIGS. 12 and 13 are schematic diagrams of embodiments of relationship between BELTs and symbol strings representing the BELT embodiments.

According to an embodiment, the association embodiment 1000 of FIG. 10 may be used to express a view two tree (e.g., a BELT) as a single string of grouping symbol pairs. In this particular embodiment, "1" and "0" are used to express two views but other distinct labels may be used to express two views. Here, in a particular embodiment, a single node tree may be associated with the grouping symbol pair "( )", which is associated with numeral one. As illustrated in FIG. 12, a single node connected by an edge having a zero label value may be represented as "( )" and a single node connected by an edge having a one label may be represented as "{ }." Encapsulation by "( )" of the symbol string associated with tree 1206 provides a symbol string "( { } )" associated with tree 1208 and corresponding to a zero-push operation on tree 1206. Similarly, encapsulation by "{ }" of the symbol string associated with tree 1202 provides a symbol string "{ ( )}" which is associated with tree 1210 and corresponding to a one-push operation on tree 1202. Accordingly, there is a one-to-one correspondence between push operations on BELTs and encapsulation operations on corresponding symbol strings.

Tree 1202, associated with symbol string "( )" and numeral one in the presently illustrated association embodiment, may be merged with itself to form tree 1204 which is associated with the numeral two and a concatenation of the grouping symbol pair "( )" and symbol string "( ) ( )." Accordingly, concatenation of the symbol pair "( )" to a symbol string corresponds with a merger of tree 1202 with a tree corresponding to the symbol string. Similarly, tree 1206 associated with grouping symbol pair "{ }" may be merged with tree 1210 associated with symbol string "{ ( )}" to provide tree 1212. Here, the resulting tree 1212 is associated with the concatenation of the grouping symbol pair "{ }" and symbol string "{( )}." Accordingly, there is a one-to-one correspondence between merger operations on BELTs and concatenation operations on symbol strings in the presently illustrated association embodiment.

Figure 13:
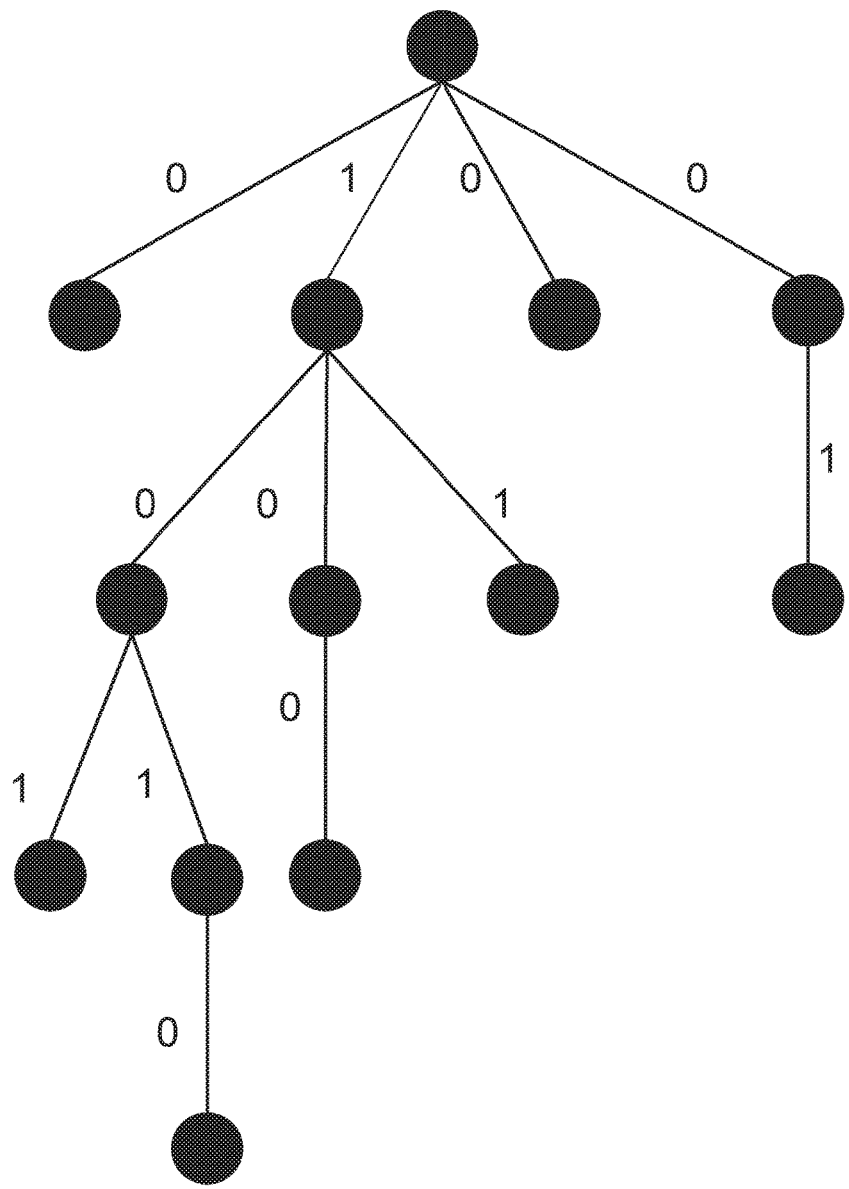

Using the same association of BELTs and symbol strings comprising grouping symbol pairs "( )" and "{ }" illustrated above with reference to FIG. 12, applying concatenation operations to symbol strings to represent associated tree merger operations on trees and applying encapsulation operations to symbol strings to represent associated push operations, any BELT may be transformed to a string of grouping symbol pairs. An additional example of such a transformation is shown in FIG. 13. As illustrated in this particular association embodiment, there exists a corresponding symbol string for any BELT and there exists a corresponding BELT for every symbol string formed according to embodiment 1000. Accordingly, such BELTs and symbol strings comprise elementary equivalents.

FIG. 11 shows a schematic diagram of an association of numerals and symbol strings comprising symbol pairs "( )" "{ }," and "[ ]." Here, the aforementioned concatenation operation of embodiment 700 also applies. That is, multiplication of a numeral associated with a symbol string by a factor of two is represented by a concatenation of the symbol string "( )." Multiplication of numerals associated with other symbol strings may be represented by a concatenation of the symbol strings.

To generate symbol strings associated with non-composite numerals, embodiment 1100 defines three encapsulation operations corresponding with the encapsulation symbol pairs "( )," "{ }" and "[ ]." In this particular association embodiment, symbol strings associated with the first four non-composite numerals, one, two, three and five comprise "( )", "( )( )," "{ }" and "[ ]," respectively. However, these are merely examples of symbol strings that may be selected as being associated with the first four non-composite numerals and the claimed subject matter is not limited in these respects. Three encapsulation operations may be used to generate symbol strings corresponding to non-composite numerals of seven or greater in an alternating fashion. As illustrated in FIG. 11, the symbol strings associated with the non-composite numerals seven, eleven and thirteen comprise "(( ))," "{( )}" and "[( )]," respectively. Accordingly, for this particular embodiment, encapsulation operation on a symbol string associated with a numeral n provides a symbol string associated with a numeral may be defined as follows:

Q(3n)=numeral associated with an encapsulation by "( )" of a symbol string associated with numeral n (where n is a natural numeral greater than 0);

Q(3n+1)=numeral associated with an encapsulation by "{ }" of a symbol string associated with numeral n (where n is a natural numeral greater than or equal to 0); and Q(3n+2)=numeral associated with an encapsulation by "[ ]" of a symbol string associated with numeral n (where n is a natural numeral greater than or equal to 0).

Figure 14:
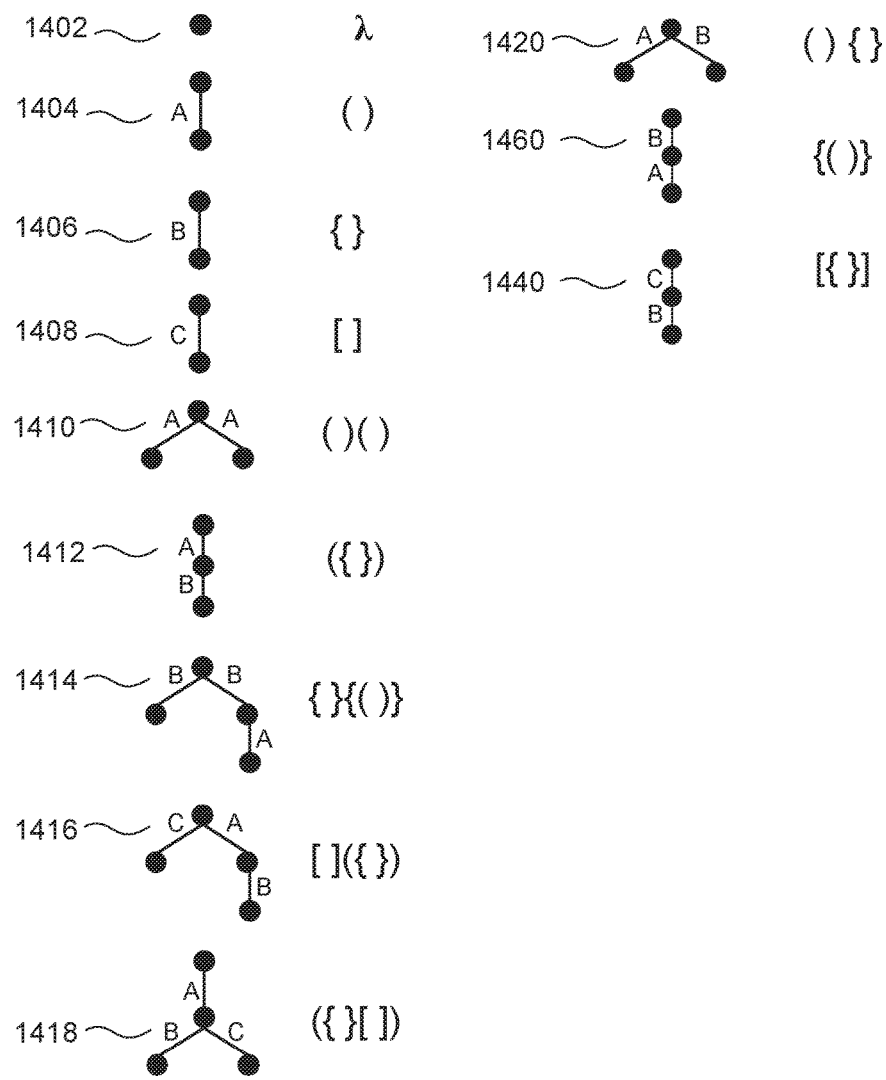
FIGS. 14 and 15 are schematic diagrams of embodiments of edge labeled trees and symbol strings representing the tree embodiments.

According to an embodiment, the association embodiment 1100 of FIG. 11 may be used to express a view three tree as a single string of grouping symbol pairs. Here, in this particular embodiment, by convention, a single node tree may be associated with the grouping symbol pair "( )", which is associated with numeral one. FIG. 14 is a schematic diagram illustrating an association of tertiary trees and symbol strings according to an association embodiment. In this particular embodiment, edges may be associated with a label value of A, B or C. However, these are merely examples of labels that may be used to express three views and that any other distinguishable three labels may be used. Here, a single node connected by an edge having a label value A may be represented as "( )" a single node connected by an edge having a label value B may be represented as "{ }" and a single node connected by an edge having a label value C may be represented as "[ ]." Encapsulation by "( )" of the symbol string associated with tree 1404 provides a symbol string "({ })" associated with tree 1208 and corresponding to an A-push operation on tree 1412. Similarly, encapsulation by "{ }" of the symbol string associated with tree 1404 provides a symbol string "{ ( )}" associated with tree 1430 and corresponding to a B-push operation on tree 1404. In yet another example, encapsulation by "[ ]" of the symbol string associated with tree 1406 provides a symbol string "[{ }]" associated with tree 1440 and corresponding to a C-push operation on tree 1440. Accordingly, there is a one-to-one correspondence between push operations on A, B, C edge labeled tertiary trees and encapsulation operations on corresponding symbol strings.

Tree 1404, associated with symbol string "( )" and numeral one in the presently illustrated association embodiment, may be merged with itself to form tree 1410 which is associated with the numeral two and a concatenation of the grouping symbol pair "( )" with itself. Accordingly, concatenation of the symbol pair "( )" to a symbol string corresponds with a merger of tree 1404 with a tree corresponding to the symbol string. Similarly, tree 1406 associated with grouping symbol pair "{ }" may be merged with tree 1430 associated with symbol string "{ ( )}" to provide tree 1414. Here, the resulting tree 1414 is associated with a symbol string comprising a concatenation of the grouping symbol pair "{ }" and symbol string "{ ( )}." In another example, tree 1408 associated with grouping symbol pair "[ ]" may be merged with tree 1412 associated with symbol string "({ })" to provide tree 1416. Here, the resulting tree 1416 is associated with a symbol string comprising a concatenation of the grouping symbol pair "[ ]" and symbol string "({ })." Accordingly, there is a one-to-one correspondence between merger operations on A, B, C edge labeled tertiary trees and concatenation operations on symbol strings in the presently illustrated association embodiment.

Figure 15:
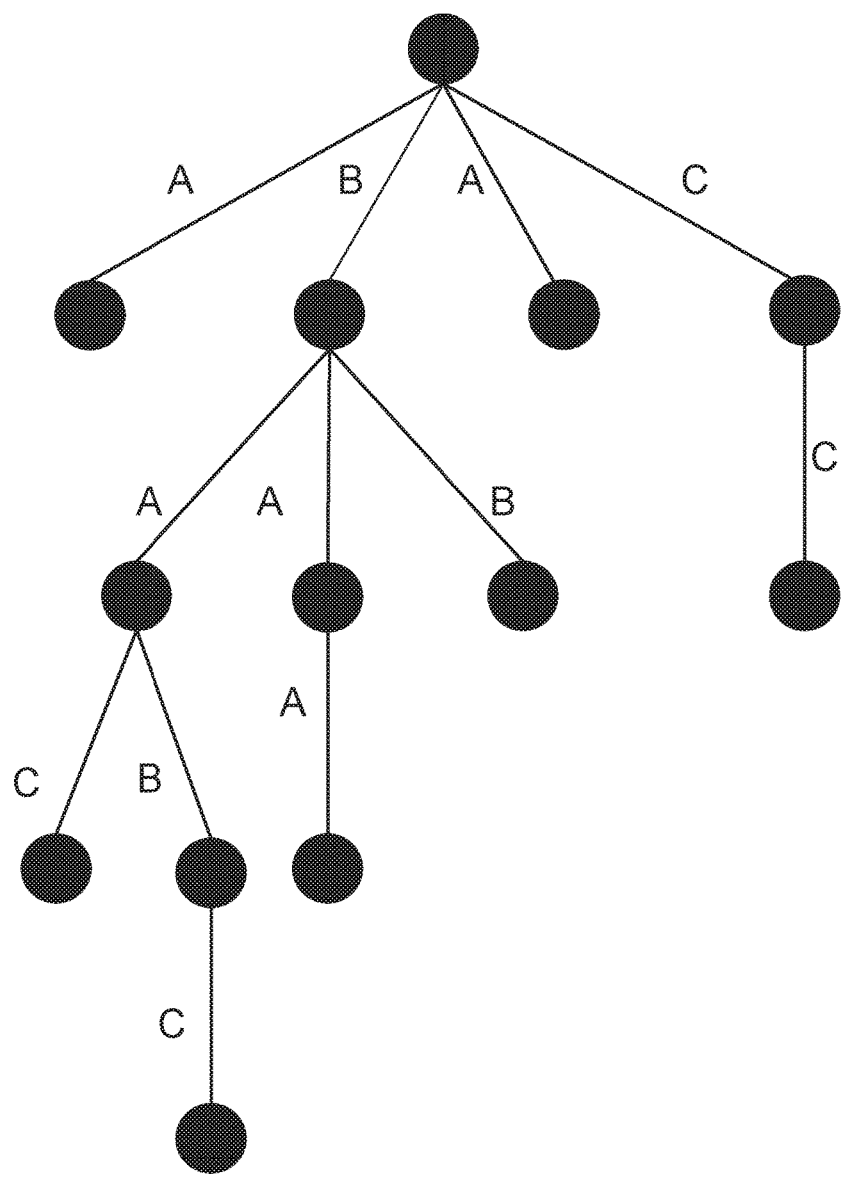

Using the same association of A, B, C edge labeled tertiary trees and symbol strings comprising grouping symbol pairs "( )," "{ }" and "[ ]" illustrated above with reference to FIG. 14, applying concatenation operations on symbol strings to represent associated merger operations on trees and applying encapsulation operations on symbol strings to represent associated push operations, any A, B, C edge labeled tertiary tree may be transformed to a string of grouping symbol pairs and vice-versa. An additional example of such a transformation is shown in FIG. 15. As illustrated in this particular association embodiment 1100, as illustrated above with BELTs in embodiment 1000, there exists a corresponding symbol string for any A, B, C edge labeled tertiary tree and there exists a corresponding A, B, C edge labeled tertiary tree for every symbol string formed according to this particular association embodiment. Accordingly, such A, B, C edge labeled trees and symbol strings comprise elementary equivalents.

As discussed above operations and/or manipulations applied to symbol strings may be related to "arithmetic operations" applied to the numerals that correspond with the manipulated symbol strings. One example above, in a particular embodiment, illustrates that the dyadic concatenation operation applied to symbol strings relates to a dyadic multiplication operation on numerals representing the concatenated symbol strings. Another example above, according to a particular embodiment, illustrates that the monadic encapsulation operation on symbol strings relates to a monadic operation applied to numerals representing the encapsulated symbol strings to provide corresponding noncomposite numerals. However, these are merely examples of arithmetic operations that may correspond with manipulations of and/or operations applied to symbol strings, and claimed subject matter may include other such arithmetic operations.

As discussed above in connection with embodiments 1000 and 1100, for a symbol string formed according to the corresponding association embodiment there exist a unique numeral and/or tree (here, a BELT or labeled tertiary tree in these particular examples). Accordingly, these relationships and/or associations among symbol strings, numerals and/or trees provide various associations between numerals and trees. Here, numerals associated with symbol strings in association embodiments 1000 and 1100 may also be associated with the trees associated with the symbol strings. Therefore, these numerals and trees associated with the symbol strings themselves form an associations of trees and numerals according to particular association embodiments.

The embodiments of FIGS. 10 and 11 illustrate that using multiple types of grouping symbol pairs, a symbol string may represent multiple views of a tree. Also, the embodiments of FIGS. 7 through 11 employ arbitrarily chosen grouping symbol pairs. It should be understood that other grouping symbol pairs may be formed from character pairs (ASCII or otherwise) that distinguish between open and close symbols such as, for example, "< >," "\ /," "$ %," "! @," "T t," "A a," etc., and that claimed subject matter is not limited in this respect. Also, it should be understood that such symbols may comprise more than one character if desired. Referring to the embodiments of FIGS. 4 and 5, for example, an encapsulation operation may be expressed using an open symbol "A(", "B(", "C(" or "D(" comprising two characters and followed by a close symbol ")".

Also, it should be understood that the grouping symbol pairs employed in the particular embodiments illustrated herein are chosen to be perceivable by human inspection for the purposes of illustrating particular examples of the claimed subject matter. However, it should be understood that the claimed subject matter is also directed to the use of grouping symbols that are not perceivable by human inspection including, for example, grouping symbols that are encoded in magnetic, optical, semiconductor and/or radio frequency energy mediums, or any other type of media capable of expressing information.

While particular embodiments illustrated herein show particular types of label values as being associated with edges connecting nodes, edge label values for other embodiments may not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to edge labeled trees, for example. However, again, this is provided for purposes of explanation and/or illustration. The claimed subject matter is not limited in scope to employing the approach of the previously referenced provisional patent application.

Thus, according to an embodiment, it may be desirable to transform between a tree and a symbol string for storing in a storage medium and/or processing in a computer platform, for example. If such a tree has a particular view, the symbols of such a string may also be chosen to express information for that view. In one embodiment, symbol strings comprising grouping symbol pairs such as "( )", "{ }" and "[ ]" may express trees as previously described. In the embodiment of FIG. 5, for example, encapsulation of a symbol string representing a tree by a grouping symbol pair "( )", "{ }" or "[ ]" may provide a symbol string representing an A-push, B-push or C-push applied to the tree. Accordingly, multiple views of a tree may be expressed by using corresponding multiple types of grouping symbol pairs. A merger of trees at a root node may be expressed by concatenating symbol strings representing the merged trees.

Particular embodiments distinguish among grouping symbol pair "types" to express corresponding multiple views of trees. In the embodiments of FIGS. 7 through 9, for example, a single grouping symbol type is used to express trees of view one. In the embodiment of FIG. 10, employing two grouping symbol pair types "( )" and "{ }", on the other hand, it is possible to express trees of view two. In the embodiment of FIG. 11, employing three grouping symbol pair types "( )", "{ }" and "[ ]", it is possible to express trees of view three. Other embodiments within the scope of the claimed subject matter may also be directed to the use of four or more grouping symbol pair types to express views of higher value trees.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. A method of converting signal values for a first expression for more convenient processing and/or storage, the method comprising:
  accessing, from memory, signal values for the first expression;
  transforming the signal values for the first expression in a first view to signal values for the first expression in a second view,
  wherein the signal values for the first expression in the first view comprise at least one of a symbol value, a numerical value, or an alphabetic value; and
  wherein the first expression in the second view comprises at least one of the following expression types: a hierarchical edge or node labeled tree or a symbol string; and
  storing, in the memory, the signal values corresponding to the first expression in the second view.

2. The method of claim 1, the symbol string including an ASCII symbol string that comprises one or more numerals.

3. The method of claim 2, the symbol string including an ASCII symbol string that comprises one or more alphabetic characters.

4. The method of claim 1, and further comprising, prior to the transforming, employing operations with respect to the signal values for the first expression in the first view.

5. The method of claim 1, and further comprising, subsequent to the transforming, employing operations with respect to the signal values for the first expression in the second view.

6. An article comprising:
  a non-transitory storage medium comprising instructions stored thereon to, said instructions being executable by one or more processors of one or more computing devices to:
  access, from memory, signal values for a first expression;
  transform the signal values for the first expression in a first view to signal values for a first expression in a second view, wherein the signal values for the first expression in the first view to comprise at least one of a symbol value, a numerical value, or an alphabetic value; and
  wherein the first expression in the second view to comprise at least one of a following expression types: a hierarchical edge or node labeled tree or a symbol string; and
  store, in the memory, the signal values corresponding to the first expression in the second view.

7. The article of claim 6, the symbol string to include an ASCII symbol string that is to comprise one or more numerals.

8. The article of claim 6, the symbol string to include an ASCII symbol string to comprise one or more alphabetic characters.

9. The article of claim 6, wherein the storage medium further comprises instructions stored thereon, the instructions being executable by the one or more processors of the one or more computing devices to employ operations with respect to the signal values for the first expression in the first view prior to the transformation.

10. The article of claim 6, wherein the storage medium further comprises instructions stored thereon, the instructions being executable by the one or more processors of the one or more computing devices to employ operations with respect to the signal values for the first expression in the second view subsequent to the transformation.

11. An apparatus comprising a computing device to convert signal values representing a first expression for more convenient processing and/or storage, the computing device to:
    access, from memory, signal values for a first expression;
    transform the signal values for the first expression in a first view to signal values for a first expression in a second view,
    wherein the signal values for the first expression in the first view to comprise at least one of a symbol value, a numerical value or an alphabetic value; and
    wherein the first expression in the second view to comprise at least one of following expression types: a hierarchical edge or node labeled tree or a symbol string; and
    store, in the memory, the signal values to correspond to the first expression in the second view.

12. The apparatus of claim 11, the symbol string to include an ASCII symbol string that is to comprise one or more numerals.

13. The apparatus of claim 12, the symbol string to include an ASCII symbol string that is to comprise one or more alphabetic characters.

14. The apparatus of claim 11, wherein the computing device is further to employ operations with respect to the signal values for the first expression in the first view prior to the transformation.

15. The apparatus of claim 11, wherein the computing device is further to employ operations with respect to signal values for the first expression in the second view subsequent to the transformation.

16. An apparatus to convert signal values for a first expression for more convenient processing and/or storage, the apparatus comprising:
    means for accessing, from memory, signal values for the first expression;
    means for transforming the signal values for the first expression in a first view to signal values for the first expression in a second view,
        wherein the signal values for the first expression in the first view comprises at least one of a symbol value, a numerical value, or an alphabetic value;
        wherein the first expression in the second view comprises at least one of following expression types: a hierarchical edge or node labeled tree or a symbol string; and
    means for storing, in the memory, the signal values corresponding to the first expression in the second view.

17. The apparatus of claim 16, the symbol string including an ASCII symbol string that comprises one or more numerals.

18. The apparatus of claim 16, the symbol string including an ASCII symbol string that comprises one or more alphabetic characters.

19. The apparatus of claim 16, the apparatus further comprising, means for employing operations with respect to the signal values for the first expression in the first view, prior to transforming.

20. The apparatus of claim 16, the apparatus further comprising, means for employing operations with respect to the signal values for the first expression in the second view, subsequent to the transforming.

21. A method of executing computer instructions on at least one computing device in which the at least one computing device includes at least one processor and at least one memory, the method comprising:
    executing computer instructions on the at least one processor of the at least one computing device, the computer instructions having been stored on the at least one memory; and
    storing in the at least one memory of the at least one computing device any results of having executed the computer instructions on the at least one processor of the at least one computing device;
    wherein the computer instructions to be executed comprise instructions for converting signal values for a first expression for more convenient processing and/or storage;
    wherein the executing the converting instructions further comprising:
    accessing, from memory, signal values for a first expression;
    transforming the signal values for the first expression to signal values for a second expression, the first expression having a first expression type and the second expression having a second expression type;
    the first and second expression types comprising at least one of the following expression types: a hierarchical edge and/or node labeled tree or a symbol string; and
    storing, in the memory, the signal values corresponding to the second expression.

22. The method of claim 21, wherein the first and second expression types comprise a symbol string including an ASCII symbol string that comprises one or more numerals.

23. The method of claim 21, wherein the signal values for the first expression comprises a hierarchical edge and/or node labeled tree and the signal values for the second expression comprises a symbol string.

24. The method of claim 21, wherein the signal values for the first expression comprises a symbol string and the signal values for the second expression comprises a hierarchical edge and/or node labeled tree.

25. The method of claim 21, and further comprising, prior to the transforming, employing operations with respect to the signal values for the first expression.

26. The method of claim 21, and further comprising, subsequent to the transforming, employing operations with respect to the signal values for the second expression.

27. The method of claim 21, wherein the signal values for the first expression comprises an ASCII symbol string comprising one or more alphabetic values and/or symbol values and the signal values for the second expression comprises a hierarchical edge and/or node labeled tree.

28. A system comprising,
    at least one computer;
    the at least one computer including at least one processor and at least one memory;
    the at least one computer to execute computer instructions without further human intervention;

the computer instructions to be executed having been fetched from the at least one memory for execution on the at least one processor; and the at least one computer to store in the at least one memory of the at least one computer any results to be generated from the execution on the at least one processor of the to be executed computer instructions;

wherein the computer instructions to be executed to comprise instructions for execution of converting signal values for a first expression for more convenient processing and/or storage;

wherein first expression signal value converting instructions to comprise:

access, from memory, signal values for a first expression;

transform the signal values for the first expression to signal values for a second expression, the first expression having a first expression type and the second expression having a second expression type;

the first and second expression types to comprise at least one of the following expression types: a hierarchical edge and/or node labeled tree or a symbol string; and store, in the memory, the signal values corresponding to the second expression.

29. The system of claim 28, wherein the signal values for the first expression comprises a hierarchical edge and/or node labeled tree and the signal values for the second expression comprises a symbol string.

30. The system of claim 28, wherein the signal values for the first expression comprises a symbol string and the signal values for the second expression comprises a hierarchical edge and/or node labeled tree.

31. The system of claim 28, wherein the converting instructions to:

prior to the transforming, employ operations with respect to the signal values for the first expression.

32. The system of claim 28, wherein the converting instructions to:

subsequent to the transforming, employ operations with respect to the signal values for the second expression.

33. The system of claim 28, wherein the signal values for the first expression comprises an ASCII symbol string comprising one or more alphabetic values and/or symbol values and the signal values for the second expression comprises a hierarchical edge and/or node labeled tree.

34. An article comprising, comprising:

a non-transitory computer usable medium having computer readable instructions stored thereon executable by at least one computer, the at least one computer comprising at least one processor and at least one memory to:

execute computer instructions on the at least one processor without further human intervention, the computer instructions to be executed having been fetched from the at least one memory for execution on the at least one processor and the at least one computer to store in the at least one memory of the at least one computing device any results to be generated from the execution on the at least one processor of the to be executed computer instructions;

the computer instructions to be executed comprising instructions to convert signal values for a first expression for more convenient processing and/or storage;

wherein the converting instructions to be executed as a result of execution to:

access, from memory, signal values for a first expression;

transform the signal values for the first expression to signal values for a second expression, the first expression having a first expression type and the second expression having a second expression type;

the first and second expression types to comprise at least one of the following expression types: a hierarchical edge and/or node labeled tree or a symbol string; and store, in the memory, the signal values corresponding to the second expression.

35. The article of claim 34, wherein the signal values for the first expression comprises a hierarchical edge and/or node labeled tree and the signal values for the second expression comprises a symbol string.

36. The article of claim 34, wherein the signal values for the first expression comprises a symbol string and the signal values for the second expression comprises a hierarchical edge and/or node labeled tree.

37. The article of claim 34, wherein the converting instructions to, prior to the transforming, employ operations with respect to the signal values for the first expression.

38. The article of claim 34, wherein the converting instructions to, subsequent to the transforming, employ operations with respect to the signal values for the second expression.

39. The article of claim 34, wherein the signal values for the first expression comprises an ASCII symbol string comprising one or more alphabetic values and/or symbol values and the signal values for the second expression comprises a hierarchical edge and/or node labeled tree.

* * * * *